(12) United States Patent
Pierle

(10) Patent No.: US 8,073,624 B2
(45) Date of Patent: Dec. 6, 2011

(54) TECHNIQUE AND SYSTEM TO PROCESS A SEISMIC SIGNAL TO DETERMINE AN ATTRIBUTE OF A GEOLOGICAL LAYER

(75) Inventor: Thomas Andrew Pierle, Conroe, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 313 days.

(21) Appl. No.: 12/402,984

(22) Filed: Mar. 12, 2009

(65) Prior Publication Data

US 2010/0235102 A1    Sep. 16, 2010

(51) Int. Cl.
*G01V 1/00* (2006.01)
(52) U.S. Cl. ......................................................... 702/14
(58) Field of Classification Search .................. 702/14
See application file for complete search history.

(56) References Cited

U.S. PATENT DOCUMENTS

| | | | | |
|---|---|---|---|---|
| 3,011,582 A | * | 12/1961 | Peterson | 367/42 |
| 3,241,102 A | * | 3/1966 | Peterson | 367/73 |
| 4,943,918 A | * | 7/1990 | Young | 702/14 |
| 5,095,465 A | * | 3/1992 | Stokoe, II | 367/14 |
| 6,131,071 A | * | 10/2000 | Partyka et al. | 702/16 |
| 6,721,661 B2 | * | 4/2004 | Anstey et al. | 702/8 |
| 2009/0292475 A1 | * | 11/2009 | Alam et al. | 702/14 |

FOREIGN PATENT DOCUMENTS

WO    98/25161 A1    6/1998

OTHER PUBLICATIONS

Widess, M.B., "How Thin is a Thin Bed?", Geophysics, Dec. 1973, pp. 1176-1180, vol. 38, No. 6.
Partyka, G.A., "Seismic thickness estimation: Three approaches, pros and cons", 71st annual International Meeting, SEG, Expanded Abstracts, Sep. 9-14, 2001, pp. 503-506, San Antonio, Texas USA.
Pierle, Thomas A., "Seismic Resolution: Thinner than first belived," SEG Expanded Abstracts, 2009, pp. 1014-1019, vol. 28.

* cited by examiner

*Primary Examiner* — Cindy Hien-Dieu Khuu

(57) ABSTRACT

A technique includes receiving seismic data indicative of a signal, which is produced by the interaction of reflection interfaces with a source wavelet. The reflection interfaces are associated with boundaries of a geological layer. The technique includes processing the seismic data to determine at least one slope change in the source wavelet caused by the interaction. The technique includes determining an attribute of the layer based at least in part on the determined slope change(s).

18 Claims, 23 Drawing Sheets

TECHNIQUE AND SYSTEM TO PROCESS A SEISMIC SIGNAL TO DETERMINE AN ATTRIBUTE OF A GEOLOGICAL LAYER

BACKGROUND

The invention generally relates to a technique and system to process a seismic signal to determine an attribute of a geological layer.

A seismic survey typically is employed for purposes of discovering hydrocarbon (oil and gas) deposits in geological formations. In the seismic survey, sources generate seismic waves, or signals, which propagate into the geological formations and create pressure changes and vibrations along their way. Changes in elastic properties of the geological formations scatter the seismic waves, changing the waves' directions of propagation and other properties. Part of the energy that is emitted by the sources reaches seismic sensors. Some seismic sensors are sensitive to pressure changes (hydrophones), others to particle motion (e.g., geophones), and industrial surveys may deploy only one type of sensors or both. In response to the detected seismic events, the seismic sensors generate electrical signals to produce seismic data. Analysis of the seismic data can then indicate the presence or absence of probable locations of hydrocarbon deposits.

Traditional seismic data processing is based on the premise that the seismic measurements are insufficient for purposes of resolving the thickness of a bedding layer, which is less than one quarter of the wavelength of the seismic signal. However, a hydrocarbon deposit may be contained in a relatively thin bedding layer that has a thickness that is less than the one quarter wavelength threshold. Examples of such thin bedding layers include sediment layers that are formed by streams, rivers, bay deposits, turbidic flows and the fragmented remains of talus slopes that are generated by wave action against reefs. Therefore, the one quarter wavelength limitation precludes the discrimination of relatively thin geological features and, in general, may prevent the discovery of certain oil and gas deposits.

Thus, there is a continuing need for better ways to process a seismic signal to detect an attribute (a thickness, for example) of a geological layer that has a thickness that is less than one quarter of the seismic signal's wavelength.

SUMMARY

In an embodiment of the invention, a technique includes receiving seismic data, which are indicative of a seismic signal. The seismic signal is produced by the interaction of reflection interfaces with a source wavelet, and the reflection interfaces are associated with boundaries of a geological layer. The technique includes processing the seismic data to determine at least one slope change in the source wavelet, which is caused by the interaction. The technique includes determining an attribute of the layer based at least in part on the determined slope change(s).

In another embodiment of the invention, an apparatus includes a processor and an interface. The interface is adapted to receive seismic data, which are indicative of a seismic signal that is produced by the interaction of reflection interfaces with a source wavelet. The reflection interfaces are associated with boundaries of a geological layer. The processor is adapted to process the seismic data to indicate at least one slope change in the source wavelet, which is caused by the interaction to provide an indication of an attribute of the layer.

In yet another embodiment of the invention, an article includes a computer-readable storage medium to store instructions that when executed by a computer cause the computer to receive seismic data, which are indicative of a seismic signal that is produced by the interaction of reflection interfaces with a source wavelet. The reflection interfaces are associated with boundaries of a geological layer. The instructions when executed cause the computer to process the seismic data to indicate at least one slope change in the source wavelet, which is caused by the interaction to indicate an attribute of the layer.

Advantages and other features of the invention will become apparent from the following drawing, description and claims.

DETAILED DESCRIPTION

Figure 1:
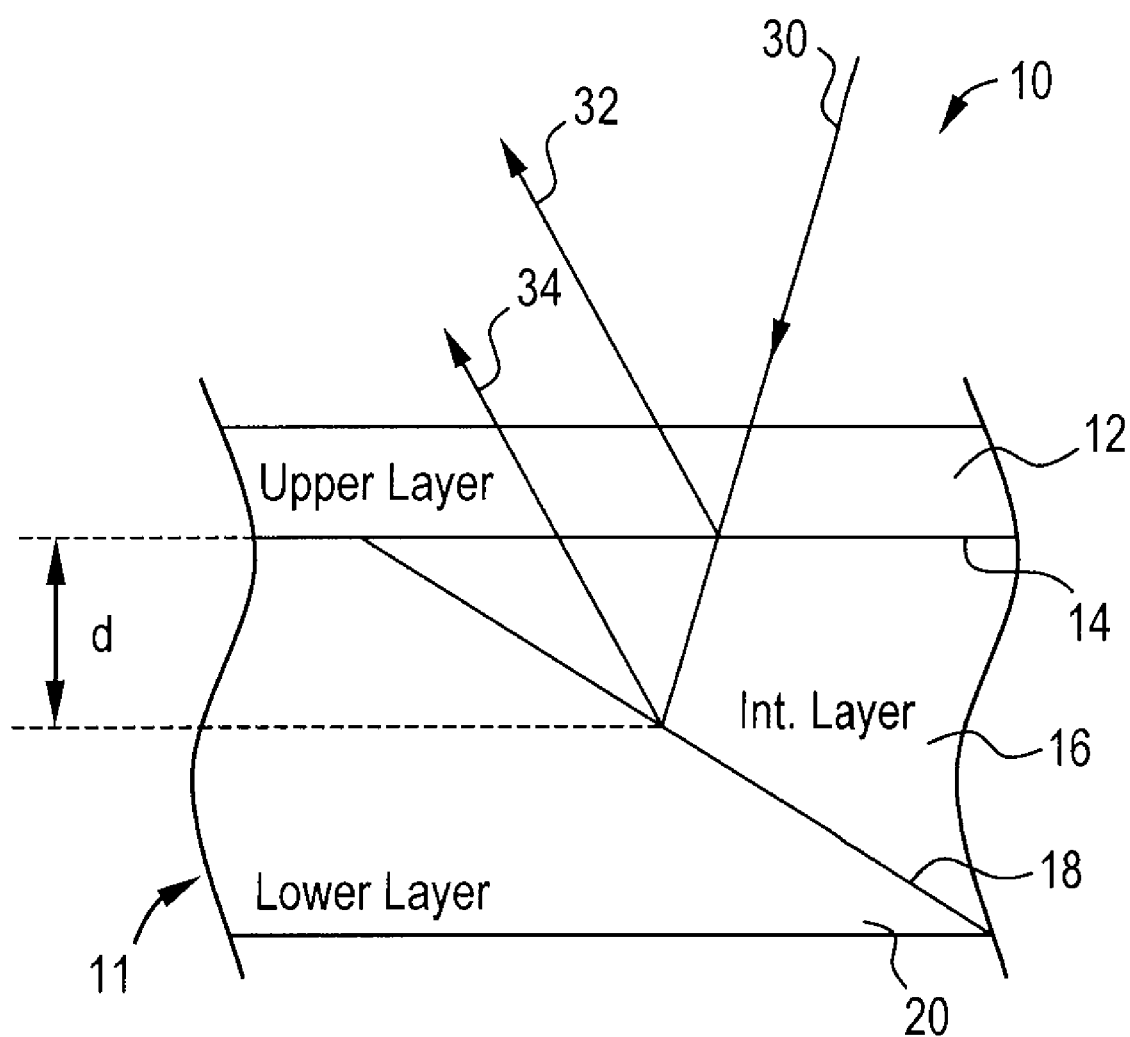
FIG. 1 illustrates an exemplary geological structure used to model the interaction of a seismic signal with layers of the structure.

In accordance with embodiments of the invention described herein, the thickness of a relatively thin geological layer may be determined by monitoring the degree in which the layer changes a slope of a seismic signal, even for a layer thickness that is less than one quarter of the seismic signal's wavelength. To illustrate this approach, FIG. 1 sets forth a model 10 that illustrates the interaction between an incident seismic signal, a source wavelet 30, and an exemplary geological structure 11. This interaction produces a primary reflected signal 32 and a secondary reflected signal 34. The primary 32 and secondary 34 reflected signals constructively interfere for relatively small layer thicknesses and, in general, may be measured by seismic sensors (not shown) and processed for purposes of gaining understanding of the structure 11.

For the model 10 that is depicted in FIG. 1, the geological structure 11 contains three exemplary layers: an upper layer 12, a wedge-shaped intermediate layer 16 and a complimentary wedge-shaped lower layer 20. The goal is to resolve a thickness (called "d" in FIG. 1) of the intermediate layer 16, which is associated with two reflectors. More specifically, as depicted in FIG. 1, a boundary 14 exists between the upper 12 and intermediate 16 layers, and a boundary 18 exists between the intermediate layer 16 and the lower 20 layer. Due to reflectivity differences, the boundaries 14 and 18 create respective reflection interfaces that influence the primary 32 and secondary 34 signals and thus, influence the composite signal that is formed from the signals 32 and 34 and is sensed by seismic sensors.

More specifically, as depicted in FIG. 1, the source wavelet 30 reflects at the reflection interface that corresponds to the boundary 14 to produce the corresponding primary reflected signal 32, and the source wavelet 30 reflects at the reflection interface that corresponds to the boundary 18 to produce the corresponding secondary reflected signal 34. The boundaries 14 and 18 are separated by the thickness d of the intermediate layer 16, which decreases from right to left across the structure 11 in FIG. 1 due to the inclination of the layer 16. For the following discussion, it is assumed that the upper layer 12 has a generally low impedance, and the intermediate layer 16 has a positive reflectivity and a relatively high impedance. The lower layer 20 is assumed to have either a negative reflectivity with a relatively low impedance or a positive reflectivity with a relatively high impedance for the different scenarios that are discussed below.

The constructive interference between the primary 32 and secondary 34 reflected signals progressively increases as the thickness d decreases such that eventually (at no separation), the signals 32 and 34 merge. Conventionally, it has been assumed that the composite reflected seismic signal that is sensed by the seismic sensors cannot be used to resolve a thickness d less than approximately one quarter wavelength of the source wavelet 30 (hereinafter called the Widess limit, or the "one quarter wavelength threshold"). However, as described herein, slope changes, which are imparted by the interaction of the source wavelet 30 and the reflection interfaces, may be observed and used to resolve a layer thickness d below the one quarter wavelength threshold.

Figure 3:
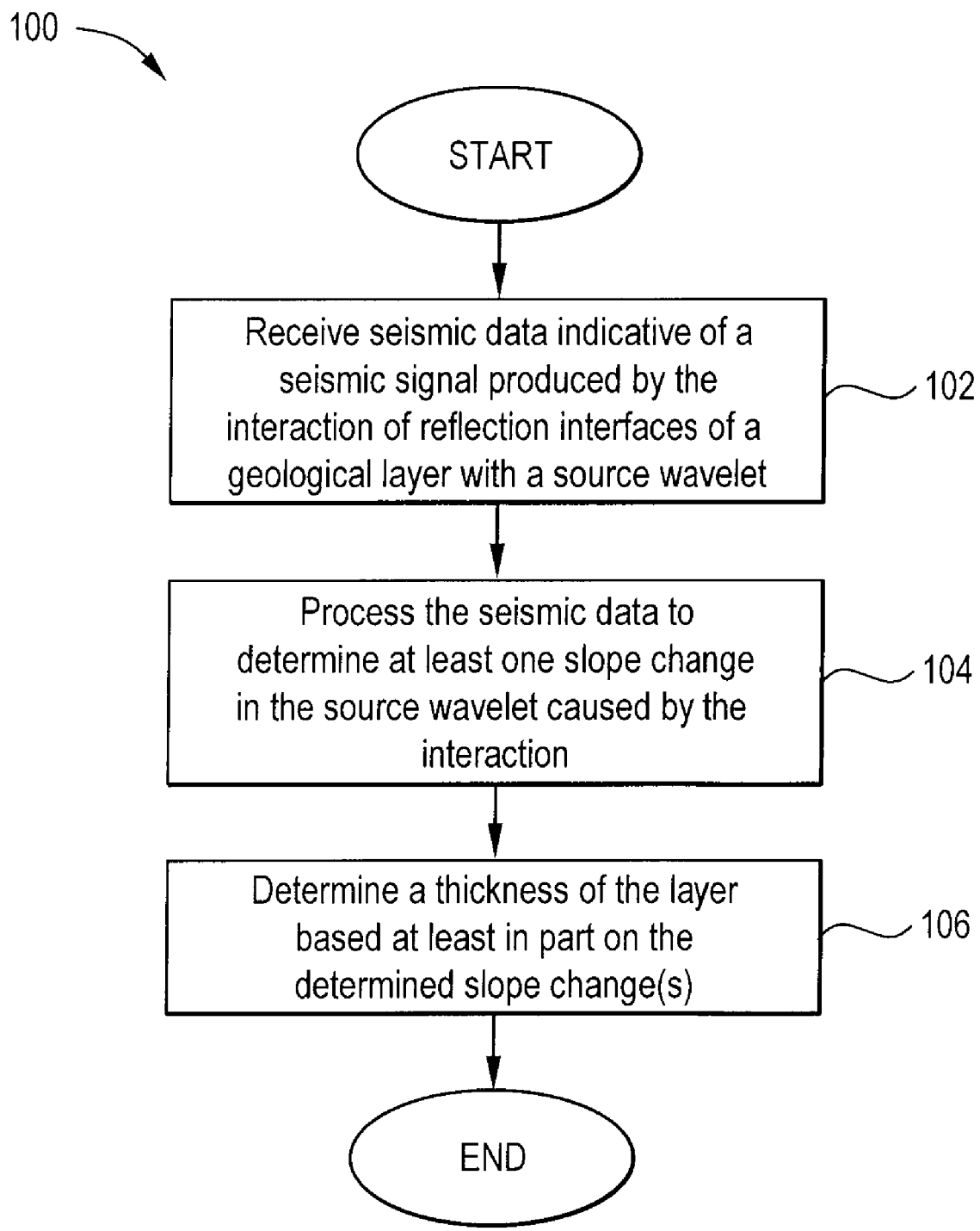
FIGS. 3, 14, 19 and 22 are flow diagrams depicting techniques to determine the thickness of a relatively thin geological layer according to different embodiments of the invention.

More specifically, referring to FIG. 3, a technique 100 in accordance with embodiments of the invention includes receiving (block 102) seismic data, which are indicative of a seismic signal that is produced by the interaction of reflection interfaces with a source wavelet. The reflection interfaces are associated with boundaries of a geological layer. The seismic data are processed (block 104) to determine at least one slope change in the source wavelet, which is caused by the interaction. As described herein, the "slope change" may be attributable to an amplitude or timing change in a particular slope of the source wavelet and may be observed by monitoring a timing change in the slope, an amplitude change in the slope or some indicator derived from a combination of these parameters. As described herein, the thickness d of the geological layer may be determined (block 106) based at least in part on the determined slope change(s).

Referring back to FIG. 1, for purposes of setting forth a non-limiting example of how the slope change may be used to resolve small layer thicknesses, the source wavelet 30 is assumed below to be a twenty Hertz (Hz) Ricker wavelet, which may be described by the following equation:

$$f(t)=(1-2\pi^2 v_M^2 t^2)e^{-\pi^2 v_M^2 t^2}$$ (Eq. 1)

where "$v_M$" represents the dominant frequency, and "t" represents time. The two reflected signals 32 and 34 are thus, also Ricker wavelets and, as described below, the signals 32 and 34 combine to form a Ricker wavelet 50 that is sensed by a seismic sensors (not shown) to form seismic measurements.

As can be seen in FIG. 1, the boundaries 14 and 18 are inclined with respect to each other and thus are separated by a progressively smaller thickness d and smaller associated separation time moving from right to left across the illustrated structure 11. Examples are described herein where the corresponding reflection interfaces are separated by certain times, beginning with 68 milliseconds, which corresponds to the maximum separation between the boundaries 14 and 18 that are depicted in FIG. 1. More specifically, the tests that are described herein vary the separation in decrements of two milliseconds until the two reflected signals 32 and 34 merge together and vanish at the upper left tip of the triangular wedge that is formed by the layer 16. In the tests that are described herein, the lower layer 20 may either be 1.) a negative reflector whose reflectivity is −25%, −50%, −75%, or −100% of the reflectivity of the intermediate layer 16; or 2.) a positive reflector whose reflectivity is 25%, 50%, 75%, and 100% of the reflectivity of the intermediate layer 16.

Figure 2:
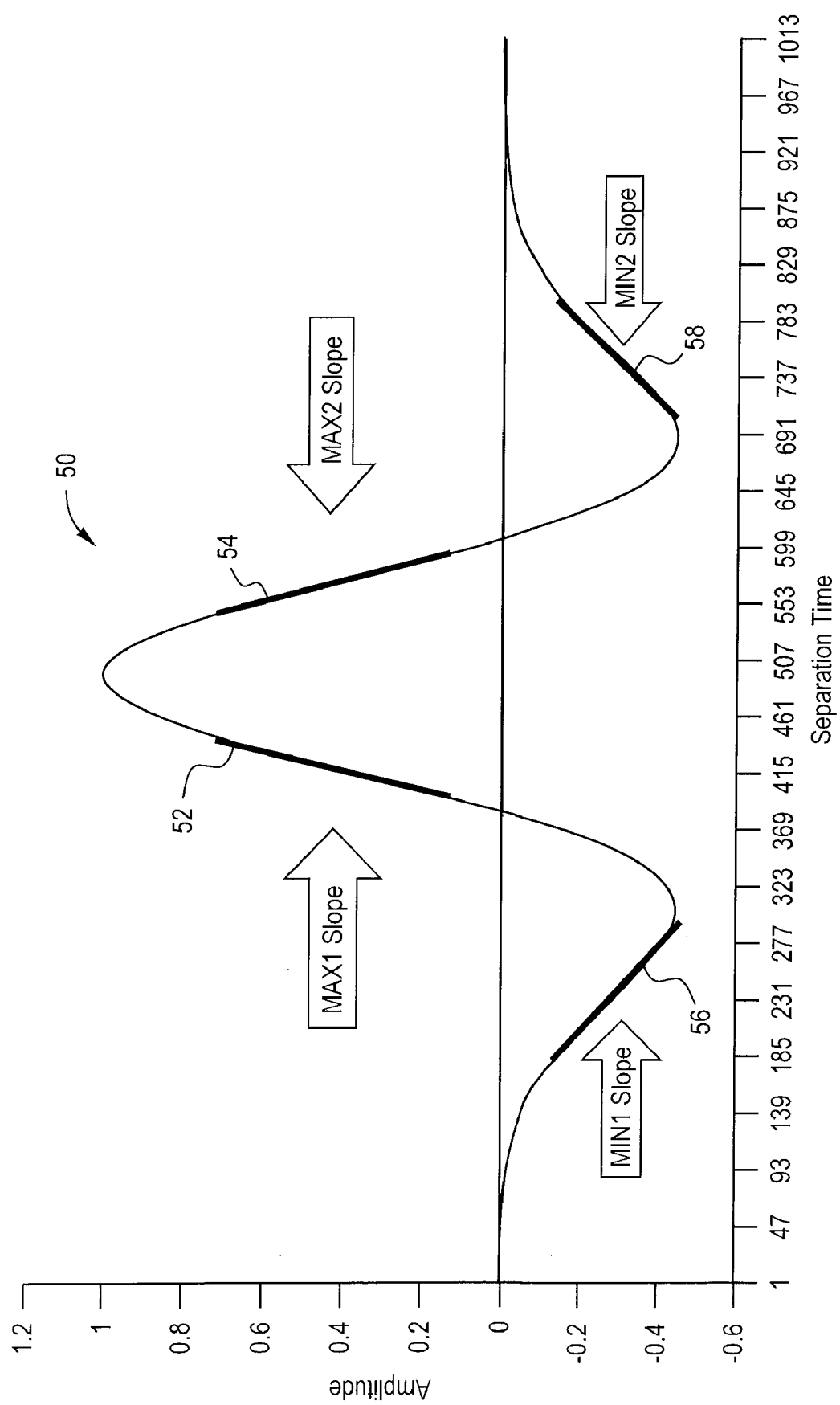
FIG. 2 is an illustration of a Ricker wavelet according to an embodiment of the invention.

The Ricker wavelet 50 that is measured by the seismic sensors is generally depicted in FIG. 2. In general, the Ricker wavelet 50 has two slopes that are located on the main lobe of the wavelet 50: a positive going slope 52 and a negative going slope 54. The Ricker wavelet 50 also has two slopes associated with the side lobes of the wavelet 50: a negative going slope 56 and a positive going slope 58. As described herein, changes (as compared to the source wavelet 30) in one or more of the slopes of the wavelet may be analyzed for purposes of resolving geological bedding layer thicknesses below the one quarter wavelength threshold. In this context, a slope change refers to the degree in which a given slope of the source wavelet changes between the source wavelet 30 and the wavelet 50.

In particular, techniques are described herein which observe and analyze changes in the slopes 52 and 54 of the wavelet 50. However, it is understood that the slopes 56 and 58 of the side lobes may also be observed or observed in lieu of the slopes 52 and 54 for purposes of determining layer thicknesses, in accordance with other embodiments of the invention. Thus, many variations are contemplated and are within the scope of the appended claims.

In general, a particular slope may be calculated using data points that are extracted from the seismic trace. The slope may then be compared to the corresponding slope that is extracted from the wavelet model (i.e., the source wavelet) for purposes of calculating the slope change. In general, the extracted slope refers to the greatest rate of change in amplitude over the corresponding interval of time.

Figure 4:
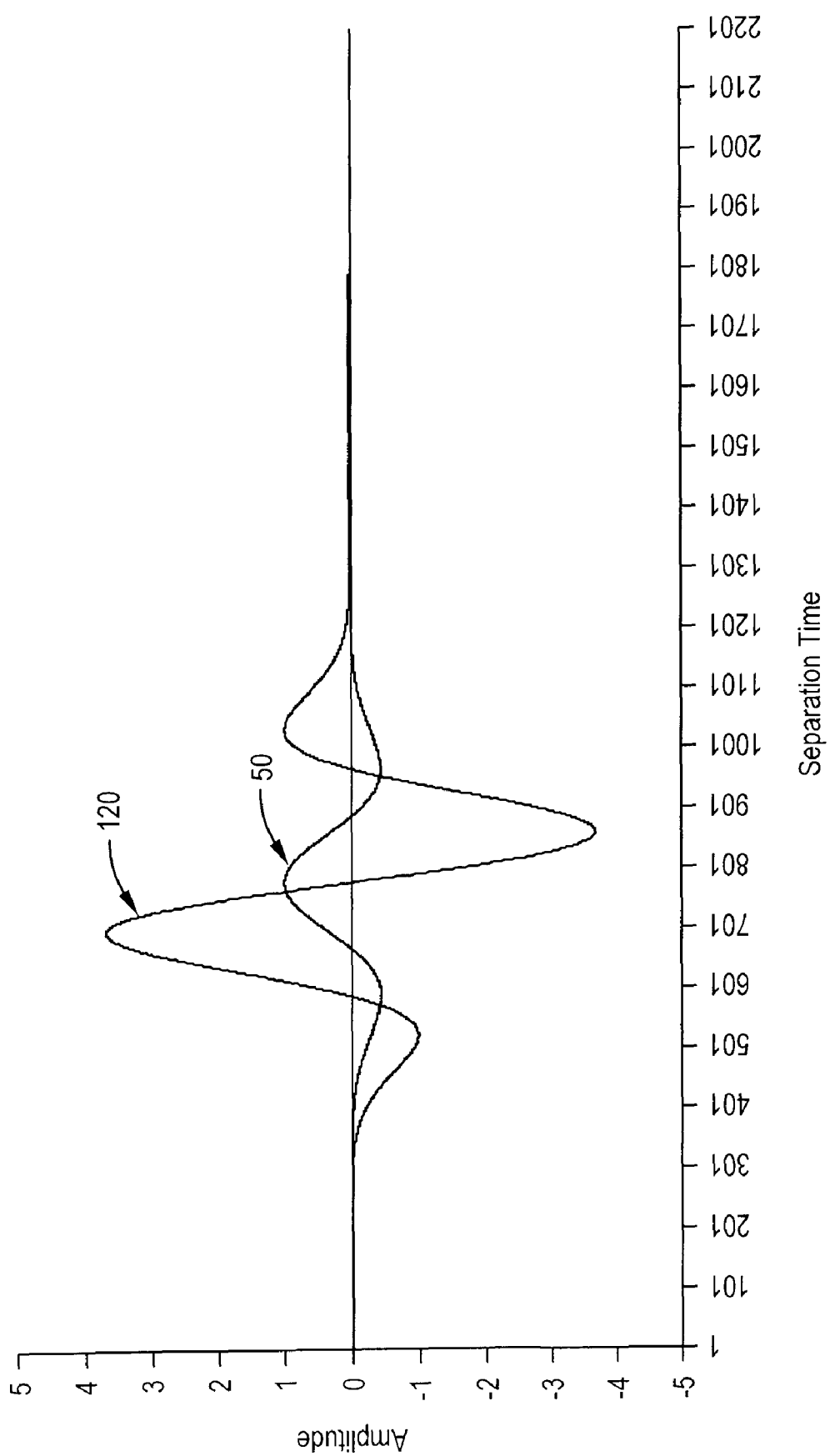
FIG. 4 is an illustration of a Ricker wavelet and its derivative according to an embodiment of the invention.

For purposes of illustrating the slopes 52 and 54 of the wavelet 50, the time derivative 120 of the wavelet 50 is depicted in FIG. 4 and in the following figures. When the primary and secondary wavelets begin to constructively interfere with each other, significant changes begin to appear in the slopes 52 and 54. The first changes occur with the portion of the time derivative 120 that corresponds to the negative going slope 54 and then these changes are followed by changes to the portion of the time derivative 120 that corresponds to the positive going slope 52. These changes continue to occur as the distance d decreases to and then surpasses the one quarter wavelength threshold. Thus, as illustrated below by way of example, the one quarter wavelength threshold does not establish the smallest thickness that may be resolved.

Figure 5:
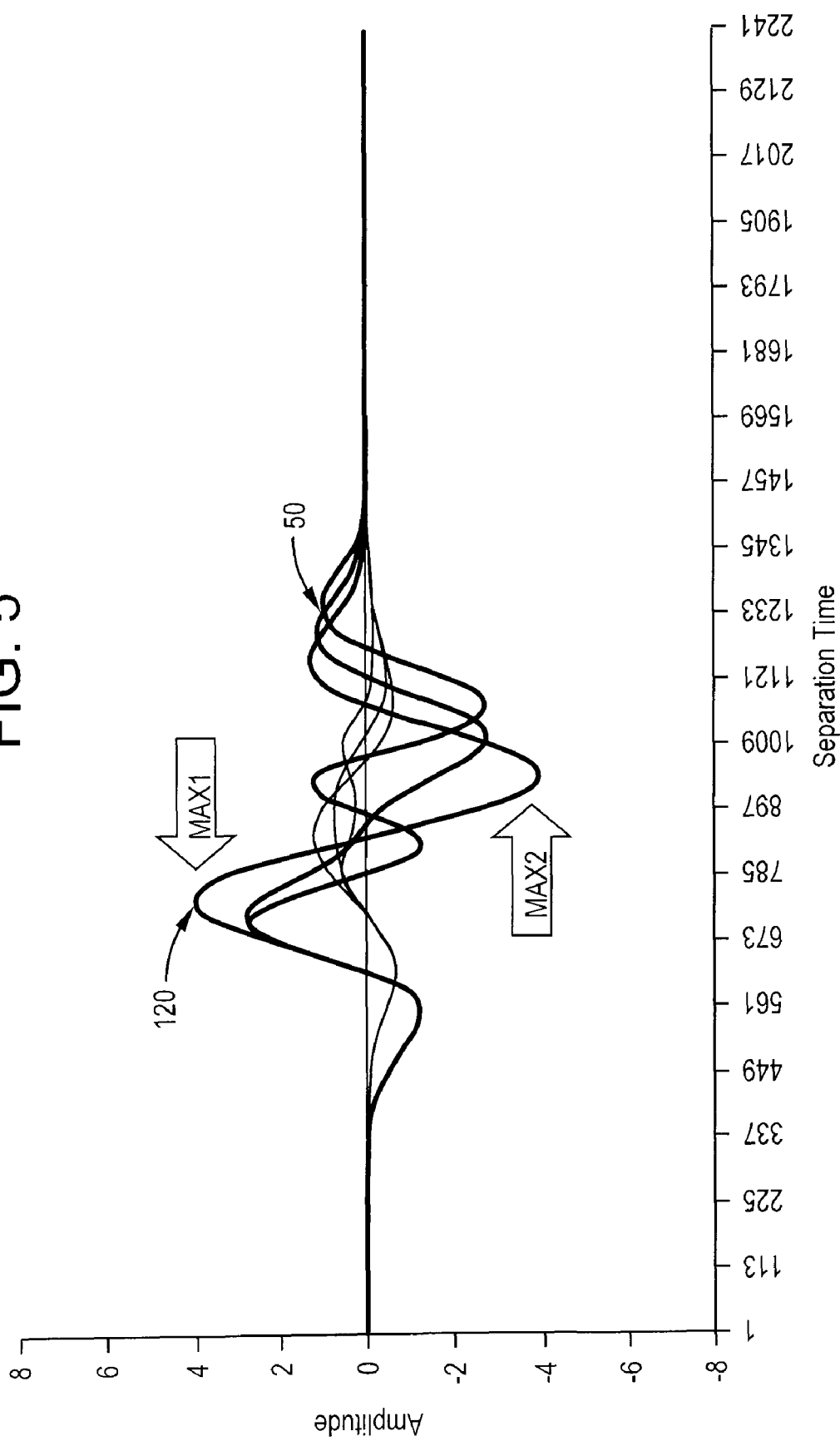
FIGS. 5 and 6 are waveforms that illustrate constructive interferences between primary and secondary reflections for different layer thicknesses according to an embodiment of the invention.
Figure 6:
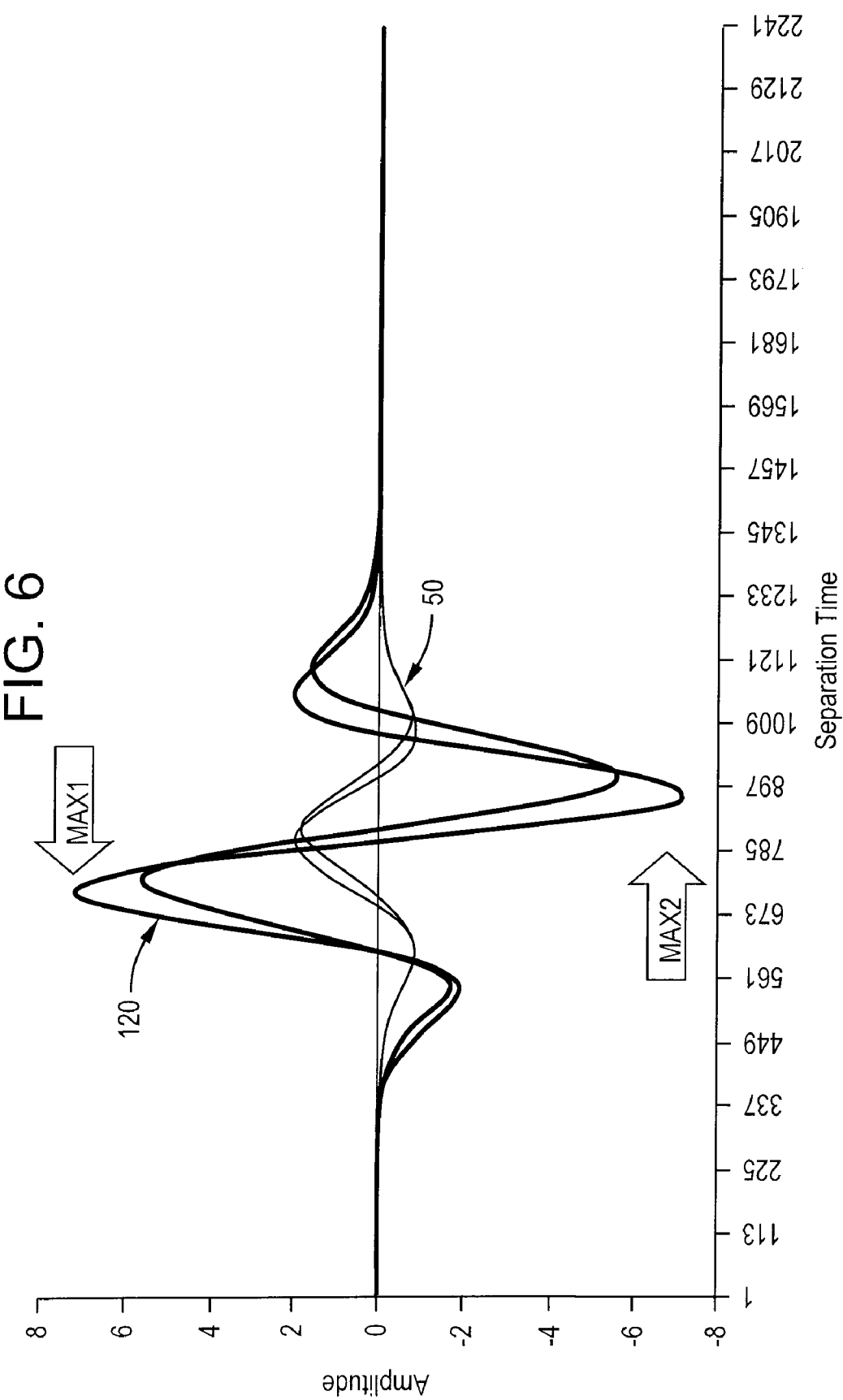

FIG. 5 illustrates exemplary wavelets 50 and their corresponding derivatives 120 as constructive interference becomes increasingly pronounced at separation times of 20 ms, 16 ms and 12 ms, respectively, across the intermediate layer 16. In this regard, as depicted in FIG. 5, the time derivative 120 significantly changes not only in slope but also in relative position in time as the separation time (and the thickness d) decreases. FIG. 6 depicts the signals when the one quarter wavelength threshold that corresponds to a separation time of 12.5 ms is reached. As can be seen from FIGS. 5 and 6, the most dramatic changes occur near the one quarter wavelength boundary.

Figure 7:
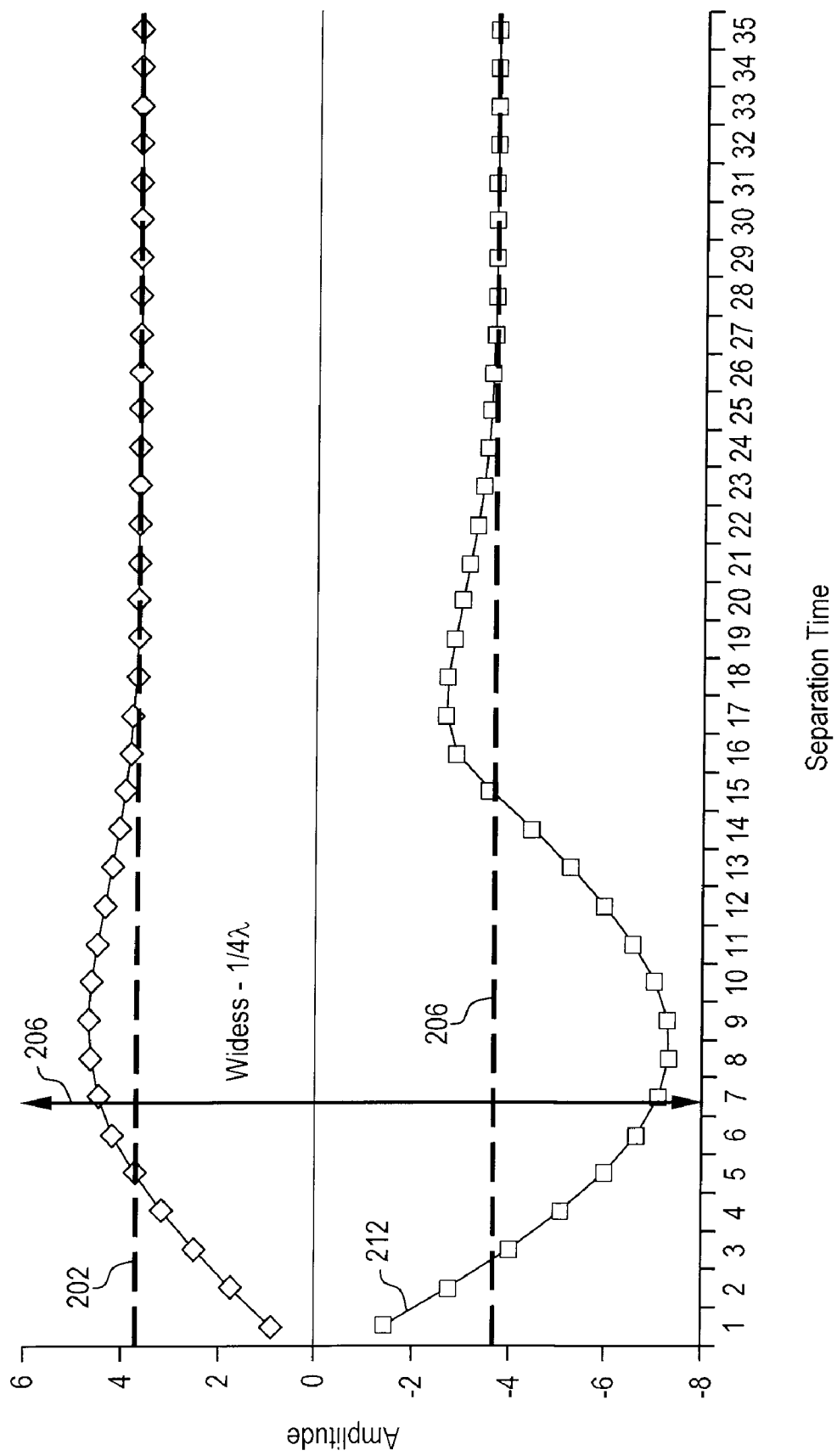
FIG. 7 contains waveforms illustrating slope changes in a wavelet as a function of layer thickness according to an embodiment of the invention.
Figure 8:
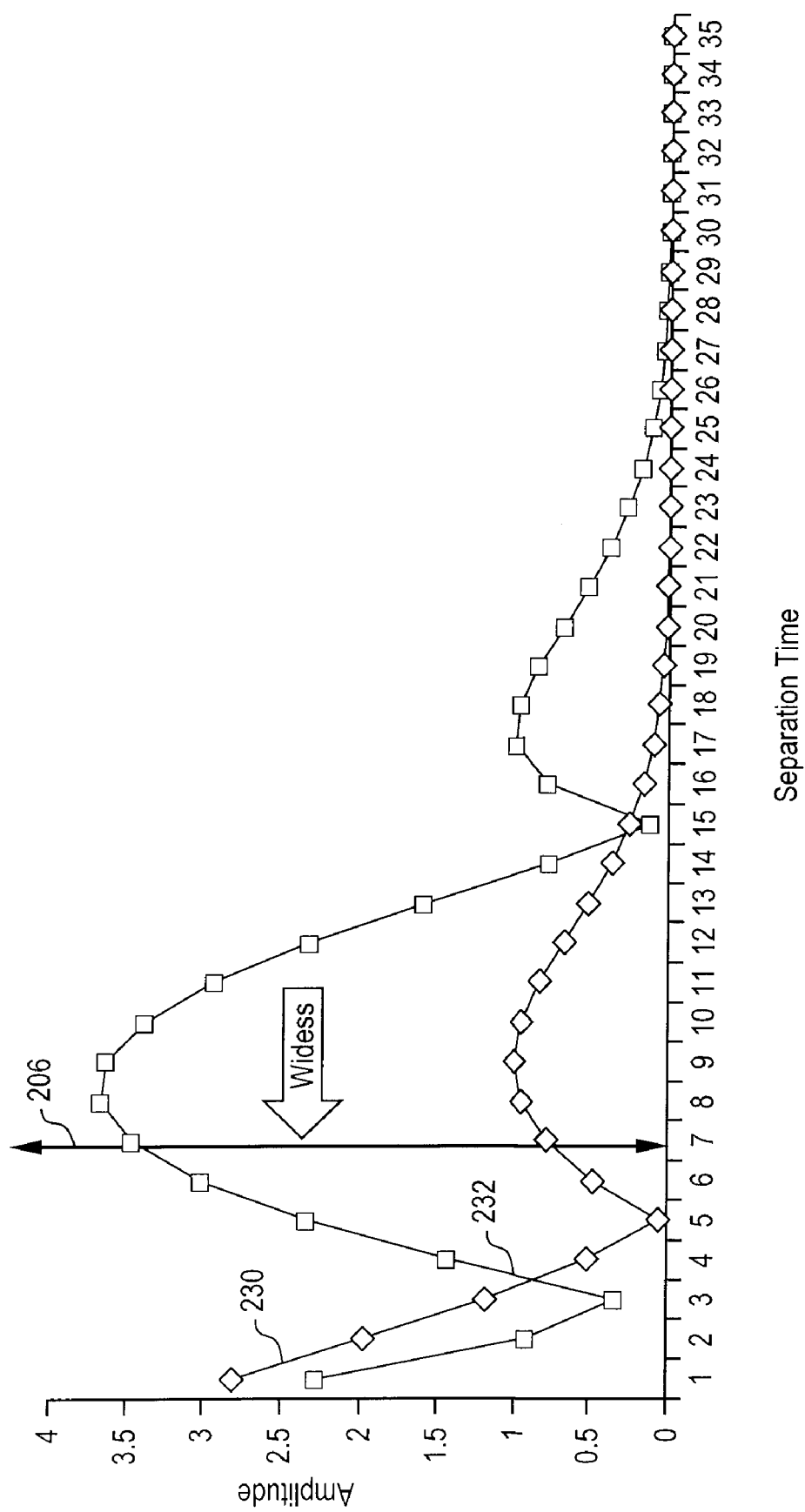
FIG. 8 contains waveforms illustrating absolute slope changes as a function of layer thickness according to an embodiment of the invention.

FIG. 7 is an illustration of two curves 204 and 212, which represent the magnitudes of the slopes 52 and 54 for different separation times. FIG. 7 also depicts the one quarter wavelength boundary time 206. As can be seen, the positive going slope 204 changes abruptly near the boundary 206, and the negative going slope 212 also changes abruptly near the boundary 206. FIG. 8 depicts an illustration of these changes in absolute form. More particularly, FIG. 8 depicts a curve 230, which illustrates the positive going slope 52 versus separation time, and a curve 232 that illustrates the magnitude of the negative going slope 54 versus separation time. Both of these slopes reveal a pronounced increase near the one quarter wavelength boundary 206, thereby demonstrating how the thickness d may be determined below the one quarter wavelength boundary.

Figure 9:
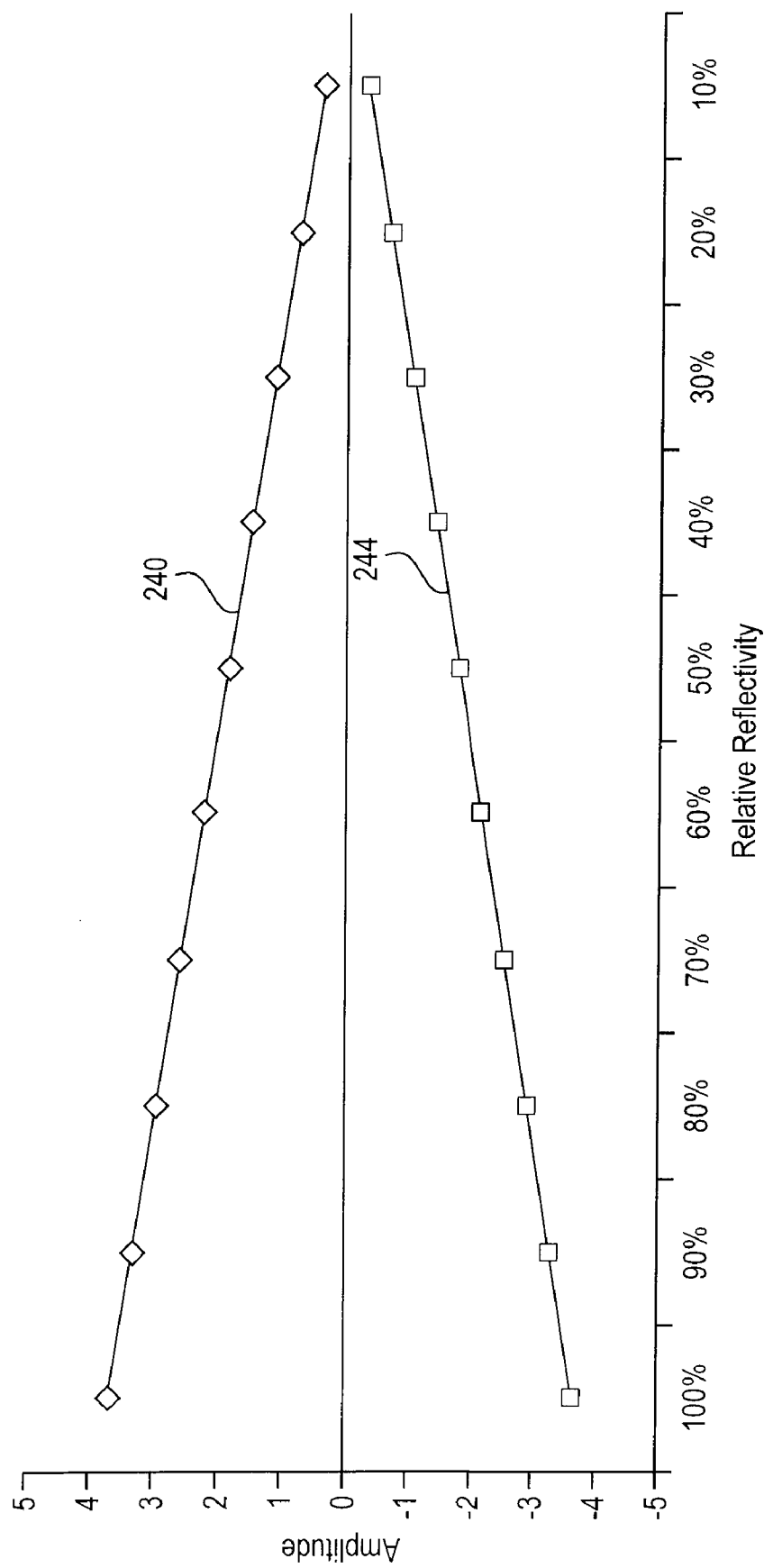
FIG. 9 is an illustration of slope amplitude as a function of reflectivity for a single reflector according to an embodiment of the invention.

It is noted that the slopes vary differently for closely-spaced reflection coefficients, as compared to single reflection coefficients that have the same combined reflection coefficients. More specifically, the slopes for the single reflector changes in a linear fashion, as shown in FIG. 9. In this regard, FIG. 9 is an illustration of a graph 240 that depicts the positive going slope 52 versus relative changes in a reflection coefficient from 100% to 0%; and a graph 244 that represents the negative going slope for the same reflection coefficients. As noted from the graphs 240 and 244, the common zero phase or minimum phase wavelet maintains an unchanging difference between the primary's positive slope and the primary's negative slope.

The reason for the linear expressions is because the values of the slopes remain parallel and never change position, even as the reflection amplitude increases from 10% to 100%. That is, the basic form of the wavelet does not change for the case of a single reflector. However, the wavelet changes in amplitude and time for the case of multiple reflectors, which allows the discrimination of different thicknesses.

The unique difference between multiple reflectors and single reflectors opens a window for an interpreter to discover the thickness of a relatively thin geological layer by comparing the results of an extracted wavelet on a model with the changes of the wavelet on the observed seismic section. When comparing the changes in time of the slope or the amplitude of the slope, the position of multiple reflectors varies and is not parallel as with a single reflection coefficient.

Figure 10:
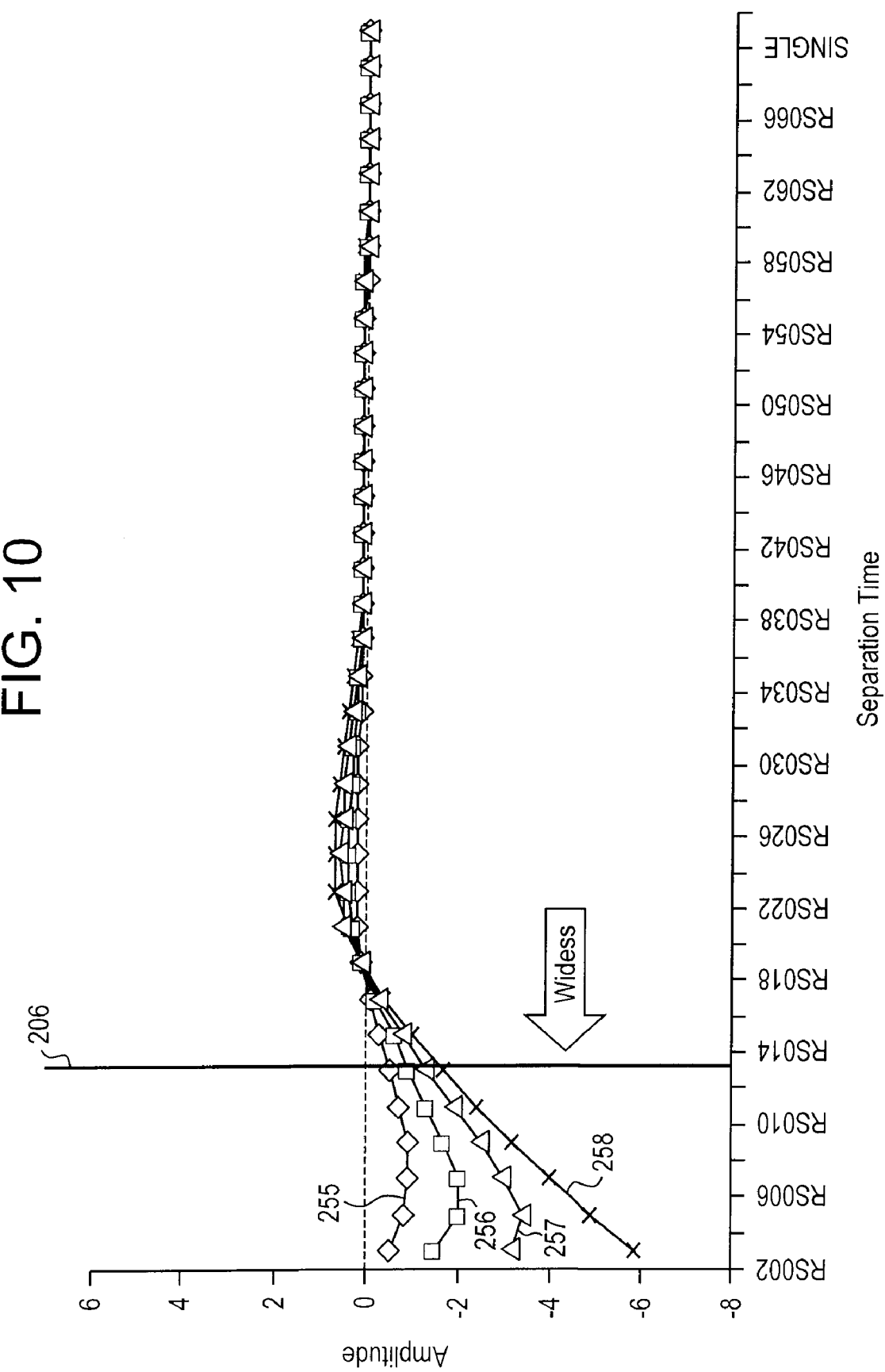
FIGS. 10, 11, 12 and 13 are waveforms illustrating time shifts in slopes of a seismic signal as a function of layer thickness according to an embodiment of the invention.
Figure 11:
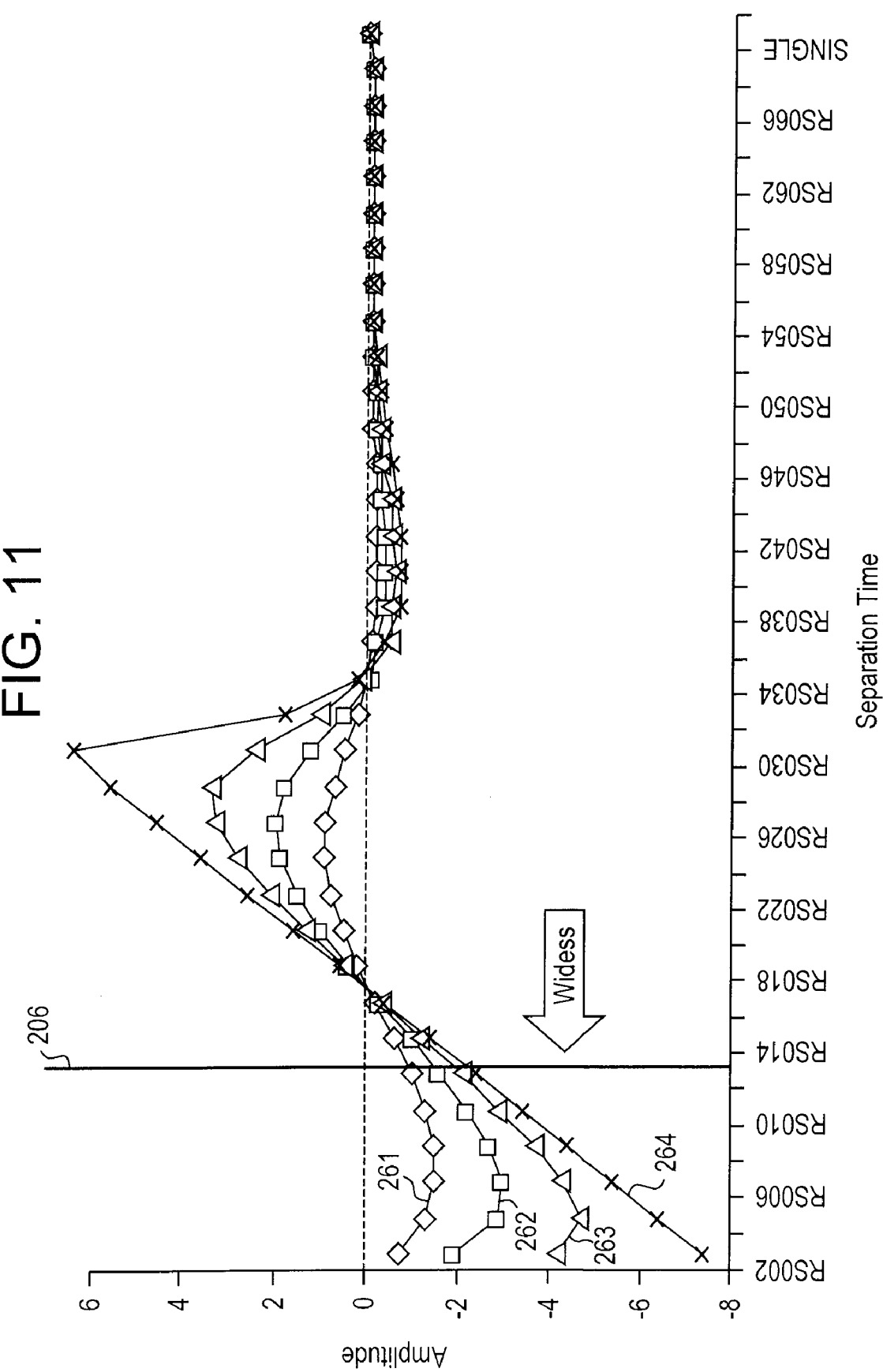

As an example, FIG. 10 illustrates how time shifts in the positive going slope 52 becomes increasingly pronounced when the one quarter wavelength threshold is approached and exceeded (i.e., for thicknesses near and below the one quarter wavelength). More specifically, FIG. 10 depicts graphs, which illustrate the time shifting of the positive going slope 56 for different thicknesses. More specifically, FIG. 10 depicts graphs 255, 256, 257 and 258, which illustrate the changes in time to the positive going slope 56 for the scenario in which the lower layer 20 (see FIG. 1) is a positive reflector and has a relative reflectivity of −25%, −50%, −75% and −100%, respectively, with respect to the intermediate layer 16. Most of the changes on the positive going slope 52 occur below the one quarter wavelength threshold and are negative, as compared to a positive change for the single reflector. Referring to FIG. 11, for the negative going slope 54, pronounced results are also apparent in graphs 261, 262, 263 and 264 that represent the time shift coefficient for the negative going slope for the same lower layer 20 for relative reflectivities of −25%, −50%, −75% and −100%, respectively. When comparing FIGS. 10 and 12, it is noted that more pronounced changes are apparent in the time changes in the negative going slope 54 before the one quarter wavelength threshold.

Figure 12:
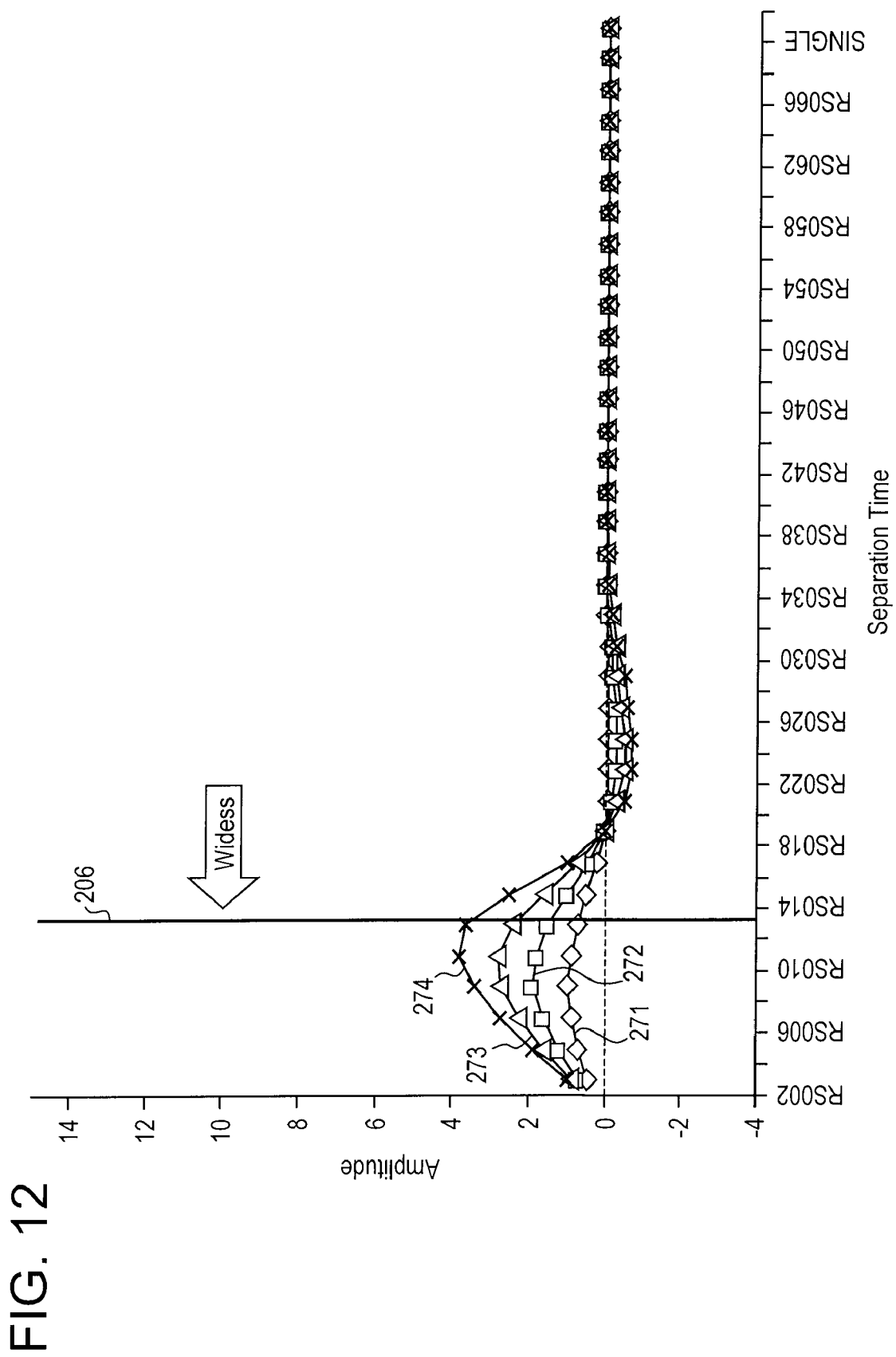
Figure 13:
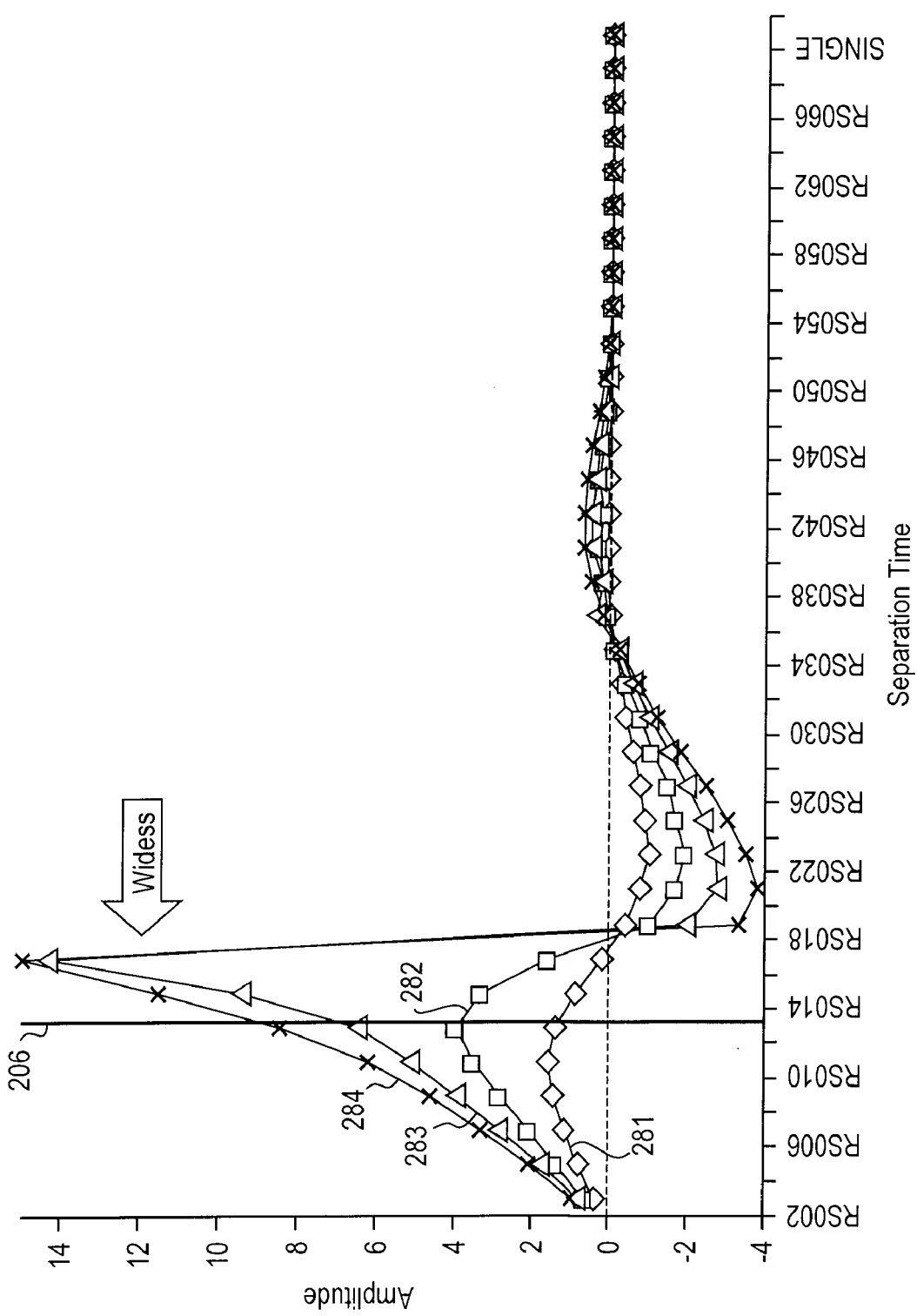

FIGS. 12 and 13 illustrate the time shifts in the positive going 52 and negative going 54 slopes, respectively for the scenario in which the lower layer 20 is a positive reflector. In this regard, for the positive going slope 52, FIG. 12 depicts graphs 271, 272, 273 and 274, for relative reflectivities of 25%, 50%, 75% and 100%, respectively. Similarly, for the negative going slope 58, FIG. 13 depicts graphs 281, 282, 283 and 284, which illustrate the time shifts for the relative reflectivity of 25%, 50%, 75% and 100%, respectively. As can be seen from FIGS. 12 and 13, the changes in the time shifts become more apparent for both the positive going 52 and negative going 54 slopes as the one quarter wavelength threshold is exceeded. Pronounced changes in the negative going slope 54 also occur before the one quarter wavelength is exceeded, as depicted in FIG. 13.

Figure 14:
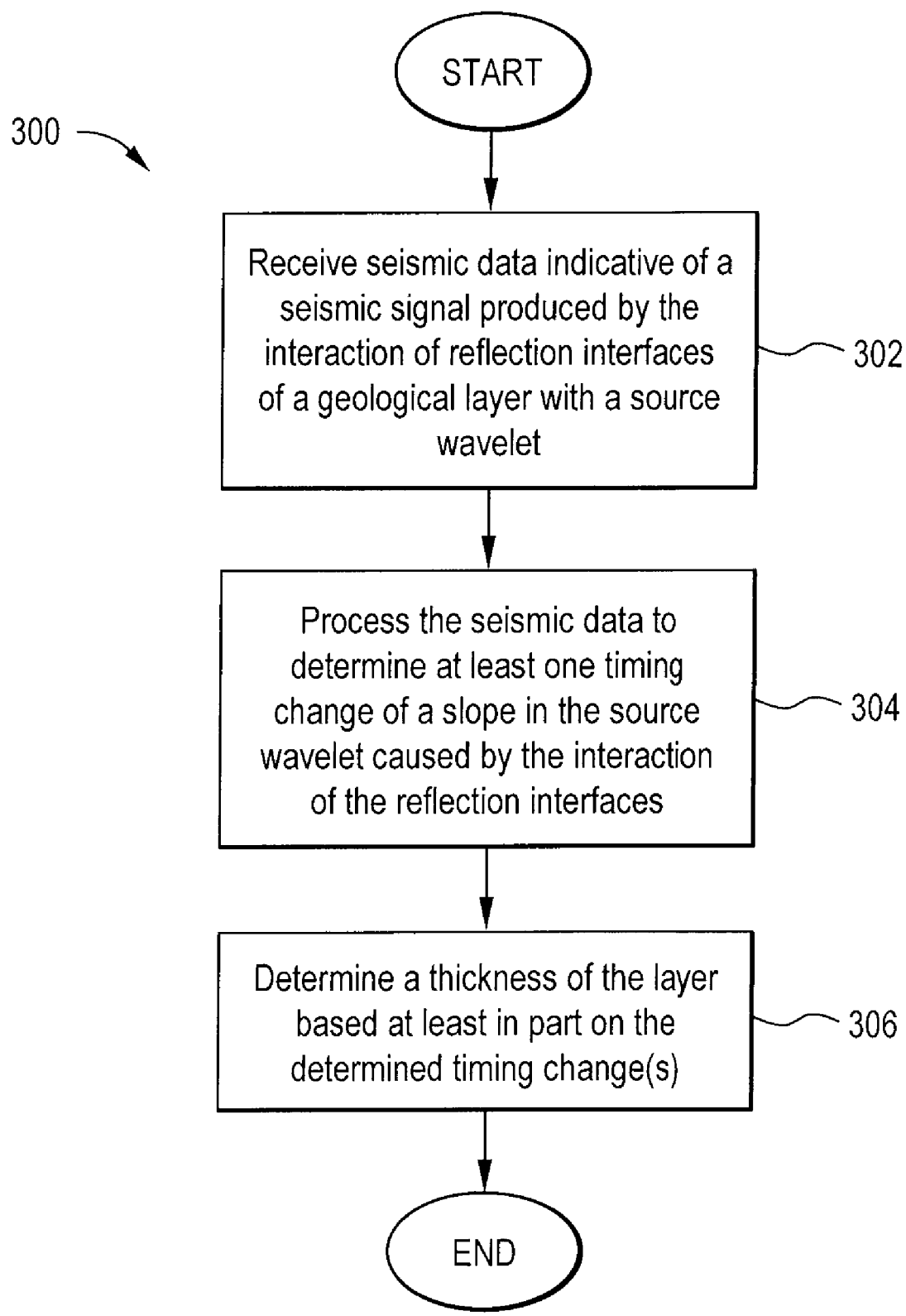

Thus, the timing changes in the slope of the observed wavelet may be used for purposes of determining the thickness of a given geological bedding layer below the one quarter wavelength threshold. Referring to FIG. 14, therefore, a technique 300 in accordance with embodiments of the invention includes receiving (block 302) seismic data, which are indicative of a seismic signal that is produced by the interaction of reflection interfaces of a geological layer with a source wavelet and processing (block 304) the seismic data to determine at least one timing change of a slope in the source wavelet, which is caused by the interaction of the reflection interfaces. A thickness of the layer may then be determined, pursuant to block 306, based at least in part on the determined timing change(s).

Figure 15:
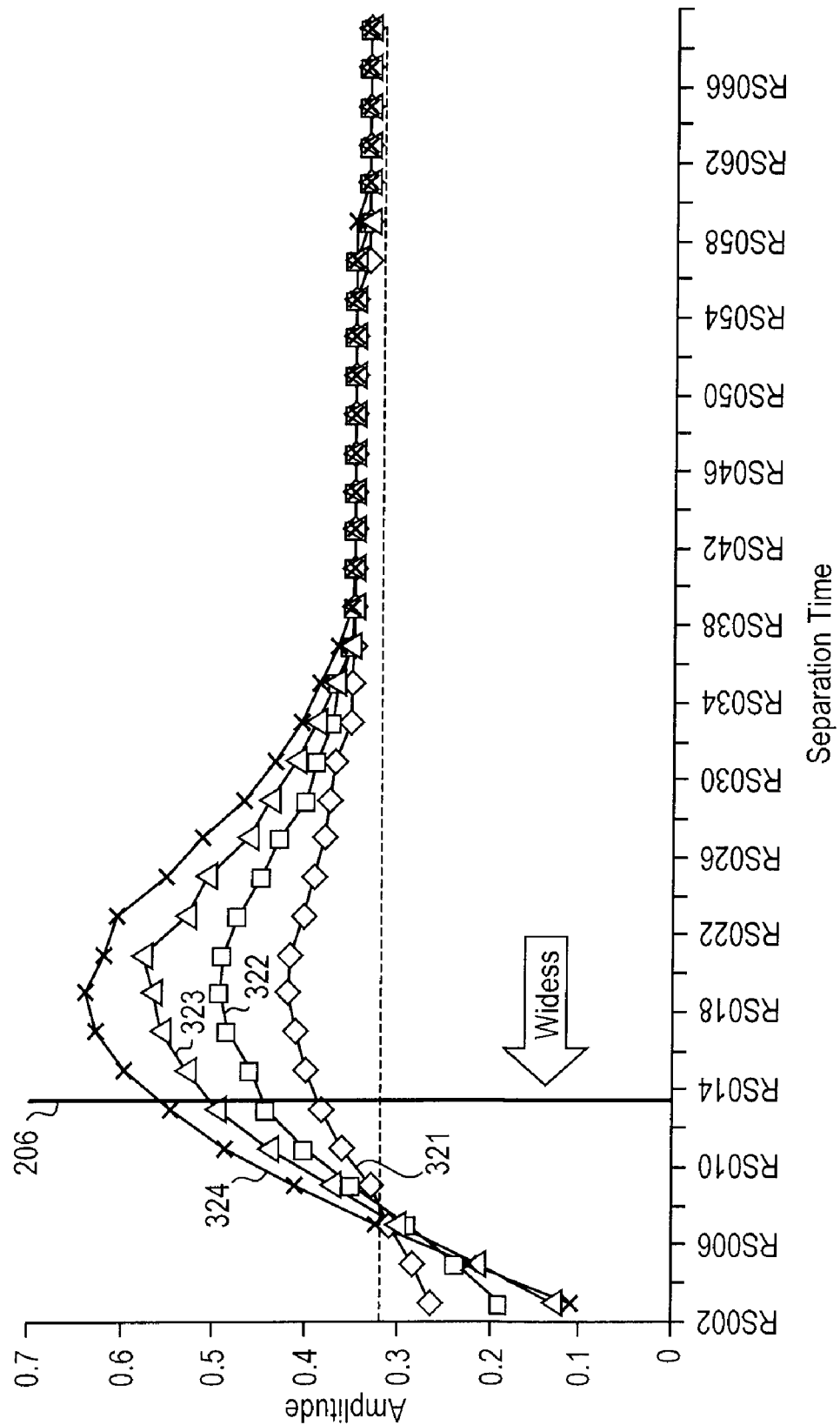
FIGS. 15, 16, 17 and 18 are waveforms illustrating amplitude changes in slopes of a seismic signal as a function of the layer thickness according to an embodiment of the invention.
Figure 16:
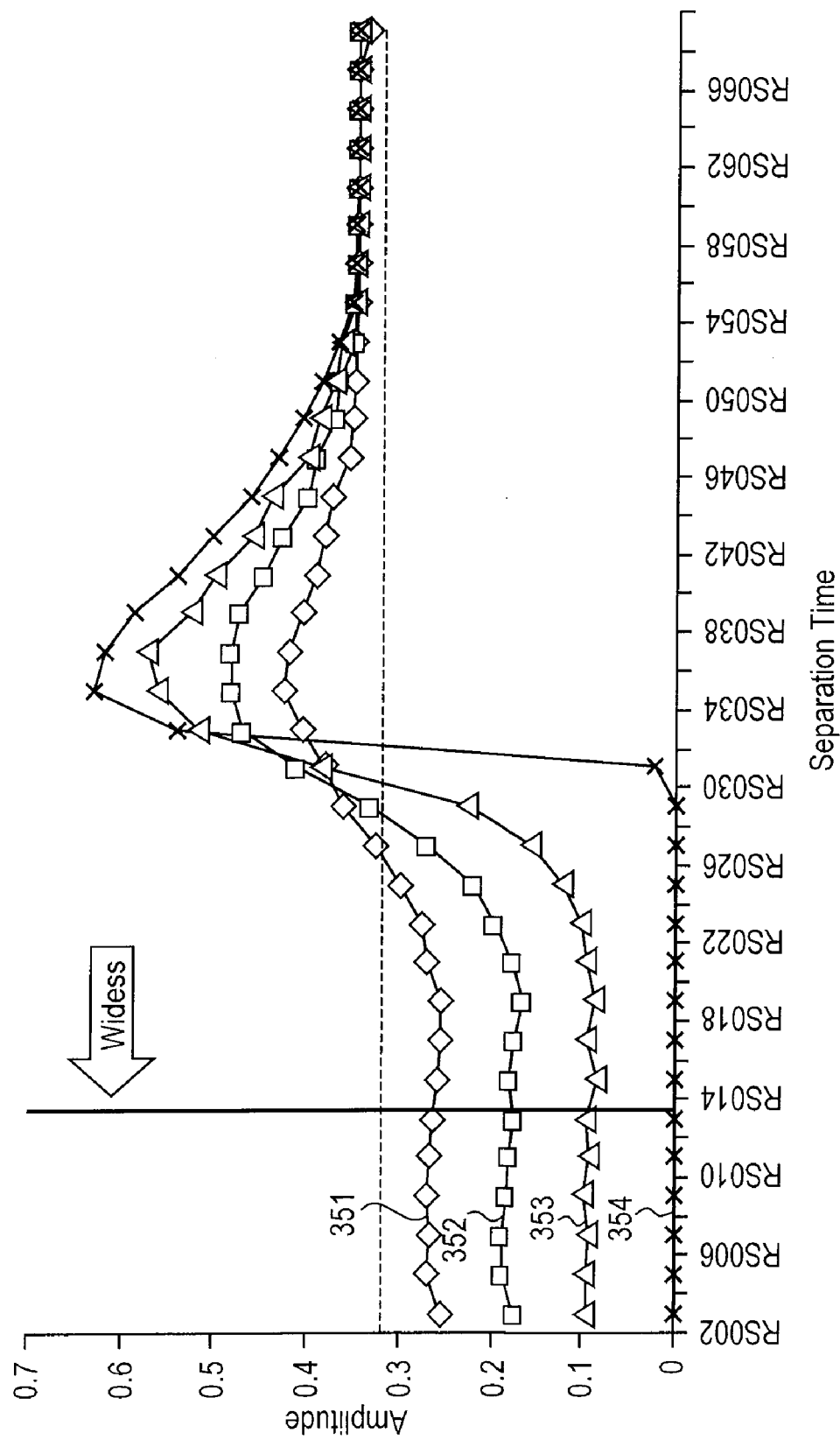

In accordance with some embodiments of the invention, the amplitudes of the slopes of a source wavelet may be analyzed for purposes of determining the thickness of a geological layer. More specifically, FIGS. 15 and 16 depict amplitude shifts in the positive going 52 and negative going 54 slopes, respectively, for the scenario in which the lower layer 20 is a negative reflector. In this regard, FIG. 15 depicts graphs 321, 322, 323 and 324 of the amplitude shift in the positive going slope 52 for the scenario in which the lower layer 20 is a respective reflection and has a relative reflectivity of relative negative reflectivity of 25%, 50%, 75% and 100%, respectively, with respect to the intermediate layer 16. As can be seen from FIG. 15, the amplitude shifts become more pronounced near the one quarter wavelength boundary and remain pronounced after the boundary threshold is exceeded. Referring to FIG. 16, graphs 351, 352, 353 and 354 depict amplitude shift graphs for relative negative reflectivities of 25%, 50%, 75% and 100%, respectively, for the negative going slope 54. As can be seen, for the negative going slope 54, the amplitude shifts are more pronounced earlier (as compared to the shifts depicted in FIG. 15, for example) and remain pronounced as the one quarter wavelength threshold is reached and exceeded.

Figure 17:
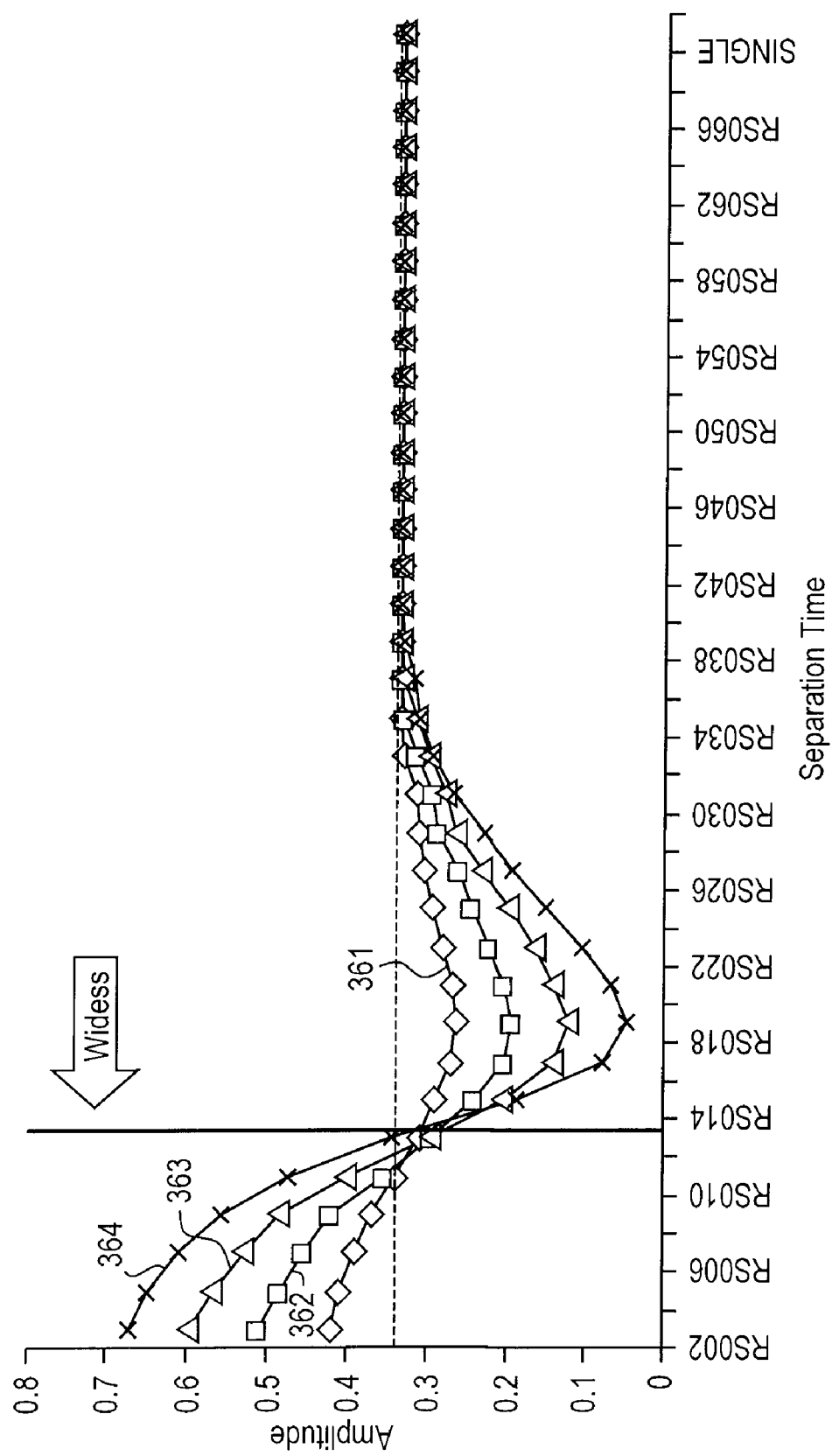
Figure 18:
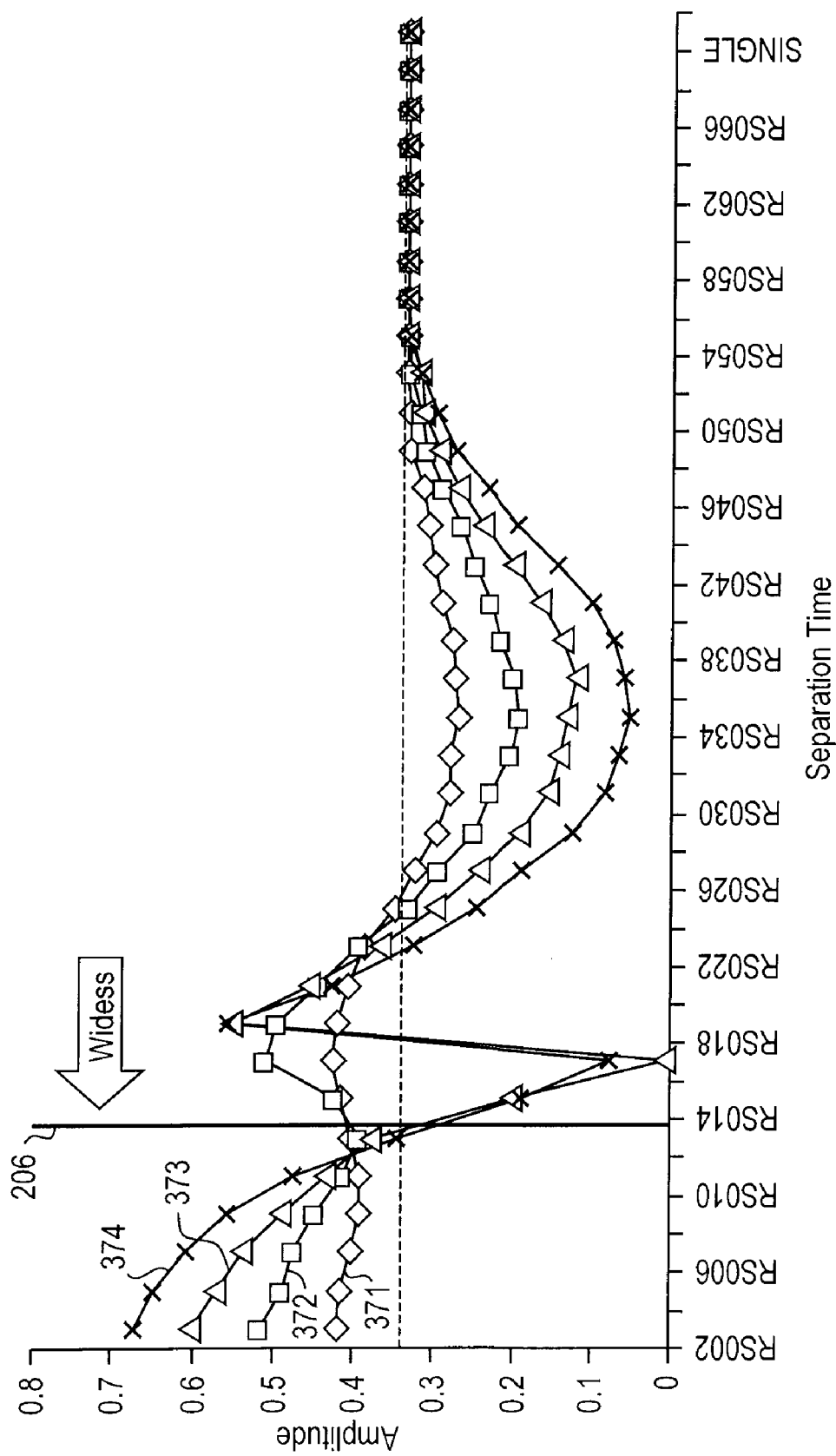
Figure 19:
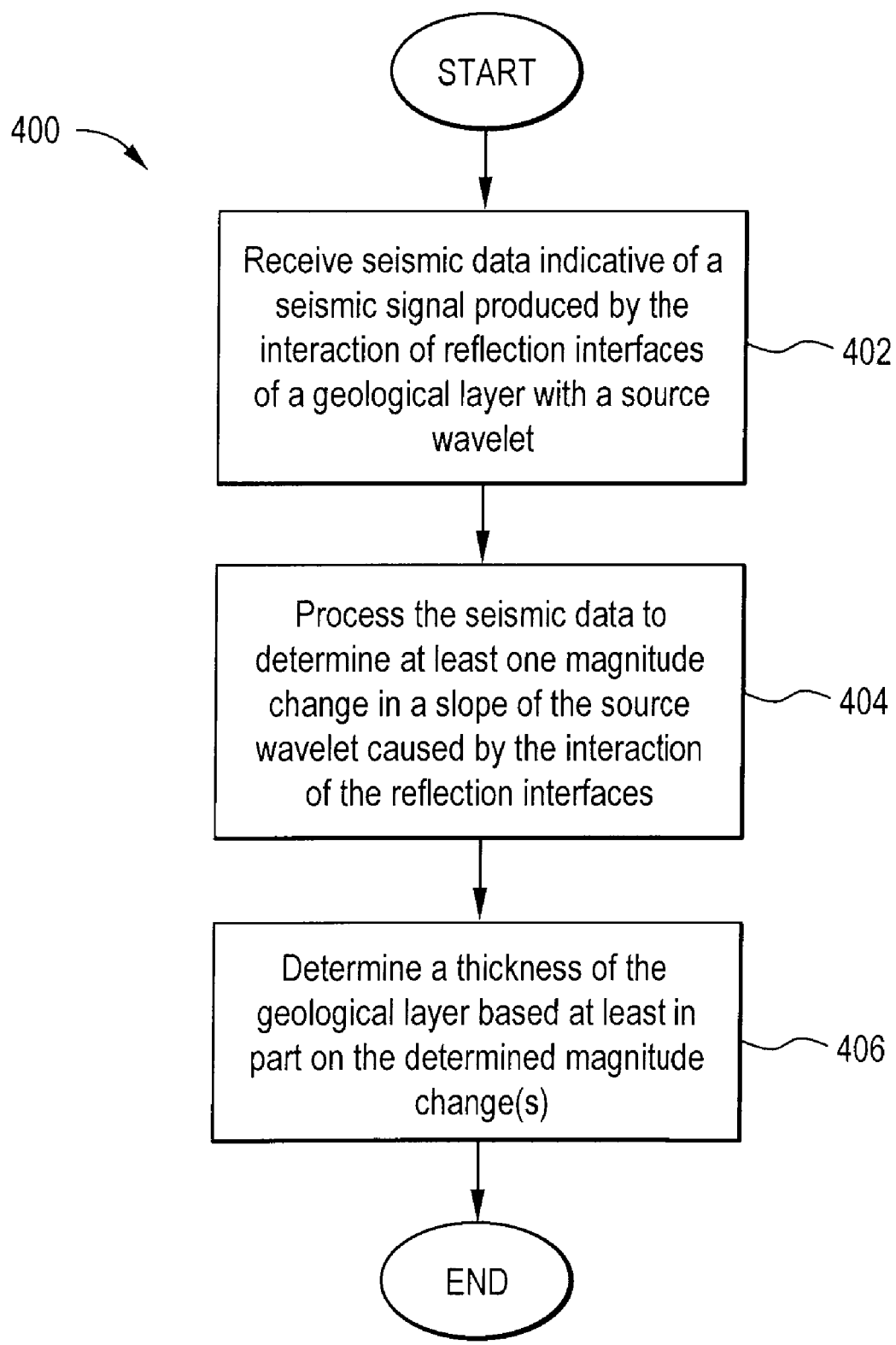

FIGS. 17 and 18 depict amplitude shifts in the positive going 52 and negative going 54 slopes, respectively, for the scenario in which the lower layer 20 is a positive reflector. In this regard, FIG. 17 depicts graphs 361, 362, 363 and 364, respectively, for amplitude shifts of the positive going slope 52; for relative reflectivities of 25%, 50%, 75% and 100%, respectively, and as can be seen, the shifts become pronounced near the one quarter wavelength boundary and remain pronounced after the boundary. Also, FIG. 19 depicts graphs 371, 372, 373 and 374 depicting amplitude shifts in the negative going slope 54 for the relative reflectivities of 25%, 50%, 75% and 100%, respectively. As can be seen, the slopes become pronounced farther out from the one quarter wavelength (as compared to FIG. 17, for example) and remain pronounced as the one quarter wavelength threshold is exceeded.

Referring to FIG. 19, to summarize, a technique 400 in accordance with embodiments of the invention may be used for purposes of determining a thickness of a geological bedding layer based on a determined amplitude or magnitude changes in the slope of the source wavelet. Pursuant to the technique 400, seismic data are received (block 402), which are indicative of a seismic signal that is produced by the interaction of reflection interfaces of a geological layer with a source wavelet. The seismic data are processed (block 404) to determine at least one amplitude, or magnitude, change in a slope of the source wavelet, which is caused by the interaction of the reflection interfaces. A thickness of the geological layer is then determined, pursuant to block 406, based at least in part on the determined magnitude change(s).

Figure 20:
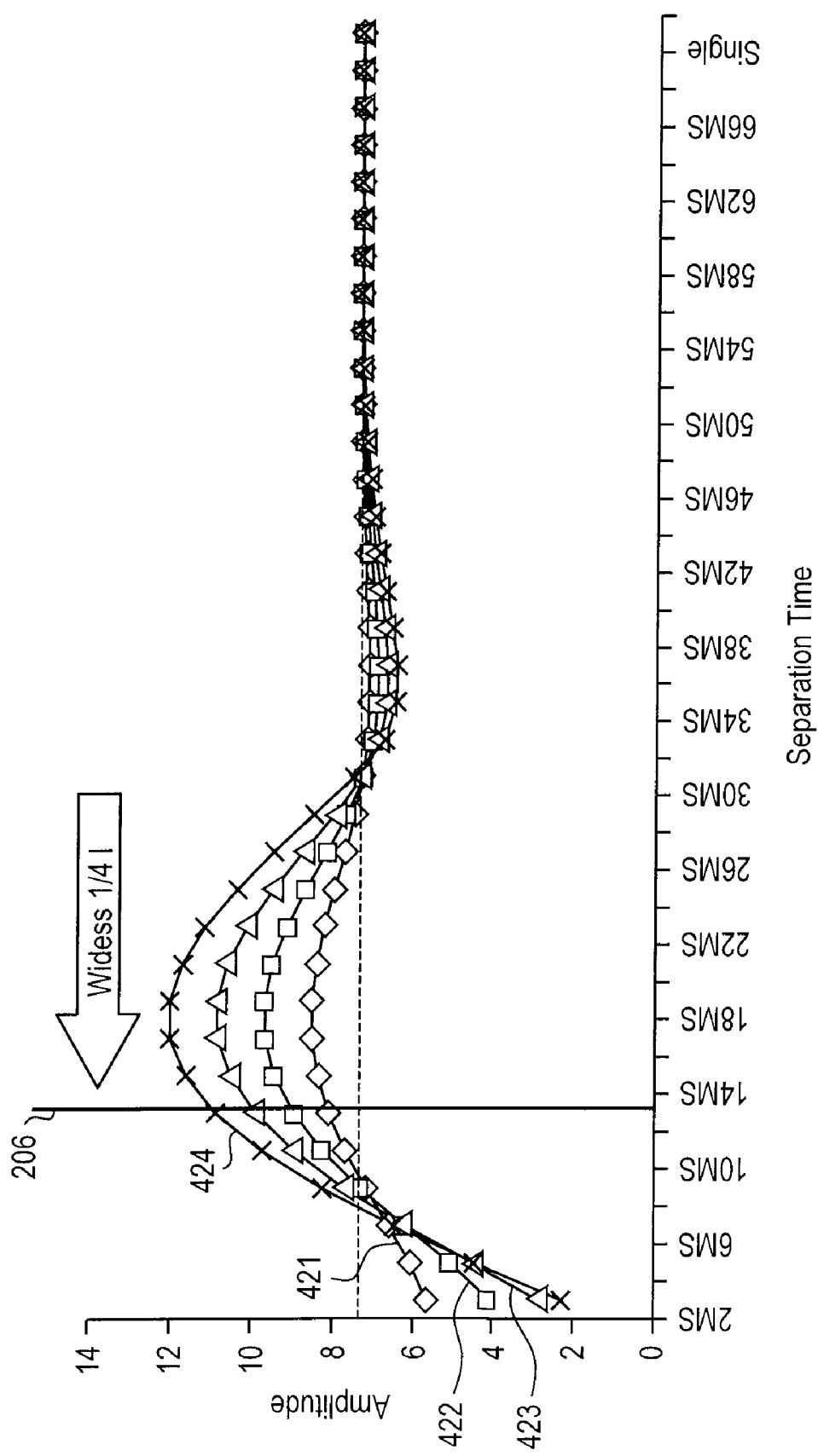
FIGS. 20 and 21 are waveforms illustrating indicators derived from a combination of slope changes of a seismic signal as a function of layer thickness according to an embodiment of the invention.

The above-described observed changes in the positive going 52 and negative going 54 slopes may be combined in other manners for purposes of determining layer thicknesses. As a non-limiting example, FIG. 20 depicts graphs 421, 422, 423 and 424 of the combined absolute value of the magnitude of the positive going slope 56 less the negative going slope 54 for the scenario where the lower layer 20 is a negative reflector and has relative reflectivities of 25%, 50%, 75% and 100%, respectively, with respect to the intermediate layer 16. As can be seen, this indicator becomes more pronounced near the one quarter wavelength threshold and remains pronounced as the one quarter wavelength threshold is exceeded.

Figure 21:
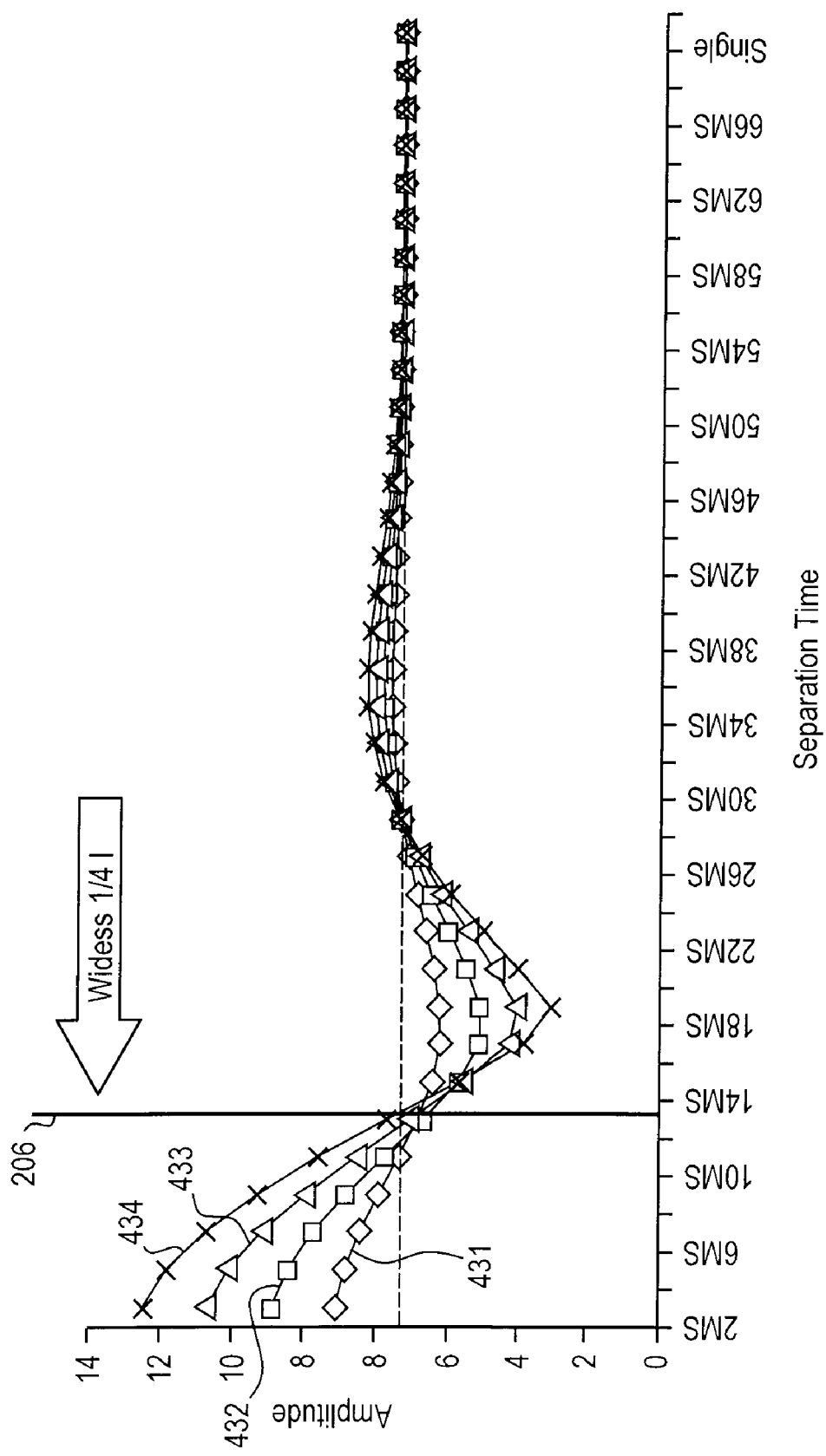

FIG. 21 depicts graphs 431, 432, 433 and 434 for the combined absolute value of the positive going slope 52 less the negative going slope 54 for the scenario in which the lower layer 20 is a positive reflector and has relative reflectivities of 25%, 50%, 75% and 100%; respectively, with respect to the reflectivity intermediate layer 16. As seen in FIG. 21, this indicator has pronounced changes near and exceeding the one quarter wavelength threshold.

Figure 22:
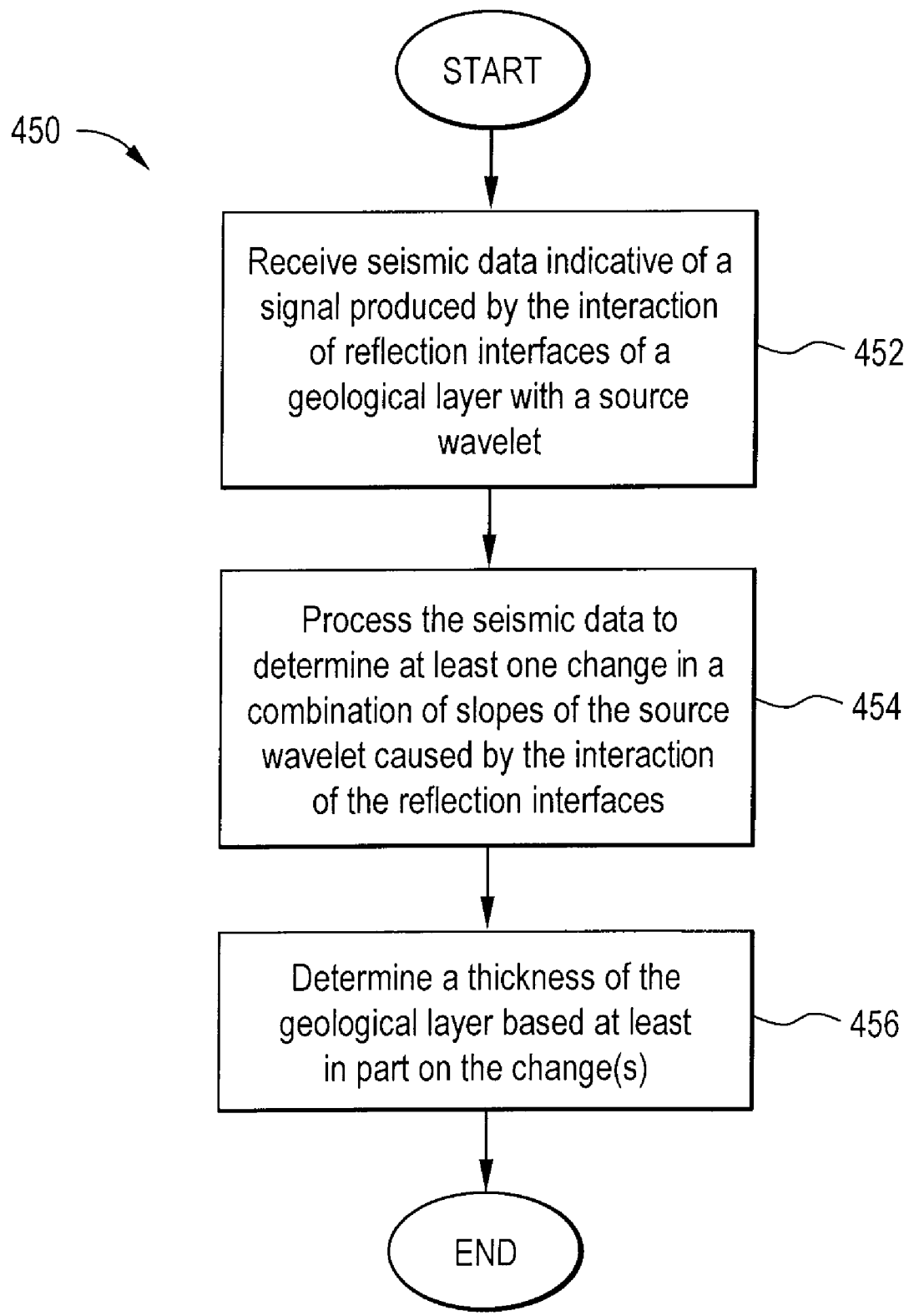

Thus, referring to FIG. 22, in accordance with some embodiments of the invention, a technique 450 may be used for purposes of determining the thickness of a geological bedding layer. Pursuant to the technique 450, seismic data are received (block 452), which are indicative of a seismic signal produced by the interaction of reflection interfaces of a geological layer with a source wavelet, and the seismic data are processed (block 454) to determine at least one change in a combination of slopes of the source wavelet caused by the interaction of the reflection interfaces. A thickness of the geological layer is then determined, pursuant to block 456, based at least in part on the change(s).

Figure 23:
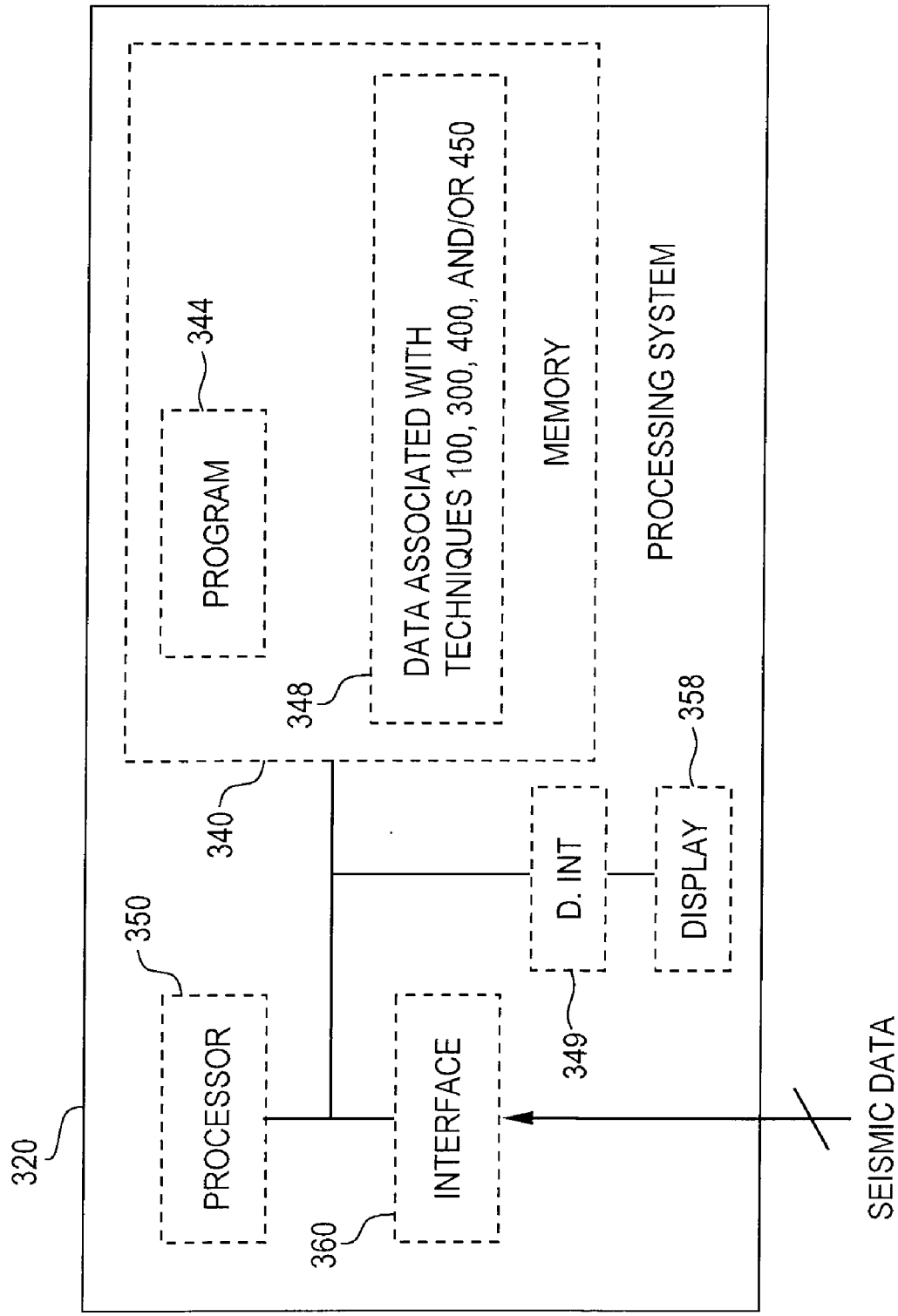
FIG. 23 is a schematic diagram of a processing system according to an embodiment of the invention.

Referring to FIG. 23, in accordance with some embodiments of the invention, a processing system 520 may be used for purposes of determining the thickness of a particular geological bedding layer. In general, the processing system 520 may includes one or more processors 550 (microprocessor packages, microprocessor cores, etc.), which execute program instructions 544 that are stored in a memory 540. As examples, the program instructions 544 may, when executed cause the processor 550 to perform one of the more of the techniques 100, 300, 400 and/or 450, which are described herein. In this regard, the processor 550, when executing the program instructions 544, may determine the thickness of a particular geological layer based on determined slope changes in an observed seismic source wavelet. These changes may be detected by, for example, determining a derivative of the sensed source wavelet and determining slope changes using detected time shifts, amplitude shifts or combinations of these parameters. In addition to the program instructions 544, the memory 540 may also store, for example, preliminary, intermediate and/or final data associated with the techniques 100, 300, 400 and/or 450. Thus, this data may include raw seismic data, processed seismic data, determined layer thicknesses, etc.

Among the other features of the processing system 520, the system 520 may include an interface 560 for purposes of receiving seismic data measurements, as well as other data related to the techniques that are disclosed herein. As examples, the interface 560 may be a communication interface (network interface, for example). As also depicted in FIG. 23, in accordance with some embodiments of the invention, the processing system 520 may includes a display 558 that is coupled to the system 520 via a display interface 549 for purposes of displaying preliminary, intermediate and final processing results in accordance with the techniques 100, 300, 400 and/or 450.

It is noted that the processing system 520 is merely an example of one of many different types of processing systems that may be used in accordance with embodiments of the invention. For example, the processing 520 may be a distributed processing system, in accordance with other embodiments of the invention. Other variations are contemplated and are within the scope of the appended claims.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
   receiving seismic data indicative of a signal produced by an interaction of reflection interfaces with a source wavelet having a wavelength, the reflection interfaces being associated with boundaries of a geological layer having a thickness less than one quarter of the wavelength; and
   processing the seismic data, using one or more processors, to determine at least one slope change in the source wavelet caused by the interaction; and
   determining an attribute of the geological layer based at least in part on the at least one determined slope change.

2. The method of claim 1, wherein the attribute comprises a thickness of the geological layer.

3. The method of claim 1, wherein
   the act of processing comprises processing the seismic data to determine at least one timing change in a slope of the source wavelet; and
   the act of determining comprises determining the attribute based at least in part on the at least one timing change.

4. The method of claim 3, wherein the at least one timing change is a time shift.

5. The method of claim 1, wherein
the act of processing comprises processing the seismic data to determine at least one magnitude change in a slope of the source wavelet; and
the act of determining comprises determining the attribute based at least in part on the at least one magnitude change.

6. The method of claim 1, wherein
the act of processing comprises processing the seismic data to determine a change in a difference between at least two slopes of the source wavelet; and
the act of determining comprises determining the attribute based at least in part on the difference.

7. The method of claim 1, wherein the source wavelet comprises a Ricker wavelet.

8. An apparatus comprising:
an interface to receive seismic data indicative of a signal produced by an interaction of reflection interfaces with a source wavelet having a wavelength, the reflection interfaces being associated with boundaries of a geological layer having a thickness less than one quarter of the wavelength; and
a processor to process the seismic data to generate an indication of at least one slope change in the source wavelet caused by the interaction to indicate an attribute of the geological layer.

9. The apparatus of claim 8, wherein the attribute comprises a thickness of the geological layer.

10. The apparatus of claim 8, wherein the processor processes the seismic data to generate an indication of at least one timing change in a slope of the source wavelet.

11. The apparatus of claim 8, wherein the processor processes the seismic data to generate an indication of at least one magnitude change in a slope of the source wavelet.

12. The apparatus of claim 8, wherein the processor processes the seismic data to generate an indication of a change in a difference between at least two slopes of the source wavelet.

13. The apparatus of claim 8, wherein the source wavelet comprises a Ricker wavelet.

14. An article comprising a non-transitory computer-readable medium containing computer instructions stored therein for causing a computer processor to:
receive seismic data indicative of a signal produced by an interaction of reflection interfaces with a source wavelet having a wavelength, the reflection interfaces being associated with boundaries of a geological layer having a thickness less than one quarter of the wavelength; and
process the seismic data to generate an indication of at least one slope change in the source wavelet to indicate an attribute of the geological layer.

15. The article of claim 14, wherein the attribute comprises a thickness of the geological layer.

16. The article of claim 14, wherein the computer instructions cause the computer processor to process the seismic data to generate an indication of at least one timing change in a slope of the source wavelet.

17. The article of claim 14, wherein the computer instructions cause the computer processor to process the seismic data to generate an indication of at least one magnitude change in a slope of the source wavelet.

18. The article of claim 14, wherein the computer instructions cause the computer processor to indicate a change in a difference between at least two slopes of the source wavelet.

* * * * *